(12) United States Patent
Grip et al.

(10) Patent No.: US 9,132,908 B1
(45) Date of Patent: Sep. 15, 2015

(54) EXPANDABLE NOSE CONE

(71) Applicant: The Boeing Company, Chicago, IL (US)

(72) Inventors: Robert Erik Grip, Rancho Palos Verdes, CA (US); John Joseph Brown, Costa Mesa, CA (US)

(73) Assignee: THE BOEING COMPANY, Chicago, IL (US)

( * ) Notice: Subject to any disclaimer, the term of this patent is extended or adjusted under 35 U.S.C. 154(b) by 179 days.

(21) Appl. No.: 13/834,296

(22) Filed: Mar. 15, 2013

(51) Int. Cl.
| | |
|---|---|
| B64C 1/30 | (2006.01) |
| B64C 23/00 | (2006.01) |
| B64G 1/00 | (2006.01) |
| B64C 30/00 | (2006.01) |
| B64C 37/02 | (2006.01) |
| F42B 10/46 | (2006.01) |

(52) U.S. Cl.
CPC ............... *B64C 1/30* (2013.01); *B64C 23/005* (2013.01); *B64C 30/00* (2013.01); *B64C 37/02* (2013.01); *B64G 1/005* (2013.01); *F42B 10/46* (2013.01)

(58) Field of Classification Search
CPC ............ B64C 1/068; B64C 1/28; B64C 1/30; B64C 1/36; B64C 30/00; B64C 23/00; B64C 23/05; B64C 37/02; F42B 10/46; F42B 10/52; B64G 1/64; B64G 1/641
USPC ................ 244/2, 119, 120, 121, 171.3, 173.3
See application file for complete search history.

(56) References Cited

U.S. PATENT DOCUMENTS

| | | | | |
|---|---|---|---|---|
| 3,114,525 A | * | 12/1963 | Morgan et al. ................. | 244/120 |
| 3,114,526 A | * | 12/1963 | Morgan ........................ | 244/120 |
| 3,261,575 A | * | 7/1966 | Lock et al. .................... | 244/120 |
| 3,266,420 A | * | 8/1966 | Schuetzler .................... | 102/386 |
| 3,331,570 A | * | 7/1967 | Kinnerley et al. ............. | 244/121 |
| 3,425,650 A | * | 2/1969 | Silva .............................. | 244/130 |
| 3,703,265 A | * | 11/1972 | Troitino .......................... | 244/13 |
| 4,549,464 A | * | 10/1985 | Hawkins et al. ............. | 89/1.809 |
| 4,650,139 A | * | 3/1987 | Taylor et al. ................ | 244/172.4 |
| 4,756,492 A | * | 7/1988 | Kranz ............................. | 244/3.1 |
| 4,770,369 A | * | 9/1988 | Flock et al. .................... | 244/3.1 |
| 5,176,338 A | * | 1/1993 | Silich ............................. | 244/39 |
| 5,245,927 A | * | 9/1993 | Ranes .......................... | 102/378 |
| 5,463,957 A | * | 11/1995 | Jensen et al. ................ | 102/293 |
| 5,464,172 A | * | 11/1995 | Jensen et al. ................. | 244/3.1 |
| 6,161,802 A | * | 12/2000 | Cunningham, Jr. ........ | 244/199.1 |
| 6,698,684 B1 | * | 3/2004 | Henne et al. .................. | 244/1 N |
| 7,093,799 B1 | * | 8/2006 | Dulat et al. ................... | 244/121 |
| 7,118,072 B2 | * | 10/2006 | Kobayashi et al. ........... | 244/130 |
| 7,278,609 B2 | * | 10/2007 | Arata ............................ | 244/130 |
| 7,887,011 B1 | | 2/2011 | Baldwin | |
| 8,056,858 B2 | * | 11/2011 | Koehler et al. ............... | 244/121 |
| 8,058,595 B2 | * | 11/2011 | Koehler et al. ............... | 244/3.1 |
| 8,955,791 B2 | * | 2/2015 | Smith et al. ..................... | 244/2 |
| 2005/0269454 A1 | * | 12/2005 | Kobayashi et al. ........... | 244/130 |
| 2006/0169841 A1 | * | 8/2006 | Dulat et al. ................... | 244/121 |
| 2009/0314890 A1 | * | 12/2009 | Koehler et al. ............... | 244/119 |
| 2010/0270430 A1 | * | 10/2010 | Koehler et al. ............... | 244/121 |
| 2013/0299626 A1 | * | 11/2013 | Smith et al. ....................... | 244/2 |

* cited by examiner

*Primary Examiner* — Joseph W Sanderson
(74) *Attorney, Agent, or Firm* — Yee & Associates, P.C.

(57) ABSTRACT

A method and apparatus for operating a nose cone. In one illustrative example, an apparatus comprises a plurality of segments and a movement system associated with the plurality of segments. The plurality of segments forms the nose cone. Each of the plurality of segments comprises a segment outer surface that forms a portion of an outer surface of the nose cone. The movement system is used to move at least one of the plurality of segments to move the nose cone between a retracted state and an expanded state.

20 Claims, 22 Drawing Sheets

EXPANDABLE NOSE CONE

BACKGROUND INFORMATION

1. Field

The present disclosure relates generally to the nose portions of aerospace vehicles and, in particular, to an expandable nose cone for an aerospace vehicle. Still more particularly, the present disclosure relates to an apparatus and method for moving the nose cone of an aerospace vehicle between an expanded state and a retracted state.

2. Background

A two-stage aerospace vehicle is an aerospace vehicle that uses two distinct stages for propulsion. Typically, the first stage is used to accelerate the vehicle after liftoff. At some point thereafter, the second stage detaches from the first stage and continues on, which in some cases, may mean orbiting. One of the primary advantages of this type of aerospace vehicle is that the entire mass of the vehicle is not carried into orbit. Rather, only the second stage is carried into orbit.

However, with a two-stage aerospace vehicle and/or other types of multi-stage aerospace vehicles, the manner in which the two stages are attached to each other during the first portion of flight becomes an issue. In particular, the various stages may need to be attached in a manner that does not affect aerodynamic performance in an undesired manner.

For example, with a two-stage aerospace vehicle, it may be desirable to align the first stage and the second stage parallel along a common axis to reduce any excess drag. With this type of configuration, however, the nose cone of the first stage may need to be shaped such that the aerodynamic performance of the first stage may allow for controlled flight after the second stage separates from the first stage. In particular, the nose cone may need to have a certain aspect ratio, which may be the diameter of the nose cone divided by the length of the nose cone. However, in some cases, the nose cone may have a longer aspect ratio than desired and, consequently, take up more space than desired. Therefore, it would be desirable to have a method and apparatus that takes into account at least some of the issues discussed above, as well as other possible issues.

SUMMARY

In one illustrative example, an apparatus comprises a plurality of segments and a movement system associated with the plurality of segments. The plurality of segments form a nose cone. Each of the plurality of segments comprises a segment outer surface that forms a portion of an outer surface of the nose cone. The movement system is used to move at least one of the plurality of segments to move the nose cone between a retracted state and an expanded state.

In another illustrative example, a nose cone comprises a fixed segment, a number of moveable segments, and a movement system. The fixed segment forms a stowage area. Each of the number of moveable segments is moveable relative to the fixed segment. The movement system is associated with the number of moveable segments. The movement system is used to move the number of moveable segments within the stowage area of the fixed segment to move the nose cone into a retracted state and to move the number of moveable segments out of the stowage area of the fixed segment to move the nose cone into an expanded state.

In yet another illustrative example, a method for operating a nose cone is provided. One of a retracted state and an expanded state is selected as a desired state for the nose cone. The nose cone comprises a plurality of segments. At least one of the plurality of segments is moved to move the nose cone into the desired state using a movement system associated with the plurality of segments.

The features and functions can be achieved independently in various examples of the present disclosure or may be combined in yet other examples in which further details can be seen with reference to the following description and drawings.

BRIEF DESCRIPTION OF THE DRAWINGS

The novel features considered characteristic of the illustrative examples are set forth in the appended claims. The illustrative examples, however, as well as a preferred mode of use, further objectives and features thereof, will best be understood by reference to the following detailed description of the illustrative examples of the present disclosure when read in conjunction with the accompanying drawings, wherein:

DETAILED DESCRIPTION

The illustrative examples described below in the figures provide an expandable nose cone and an apparatus and method for moving this nose cone between an expanded state and a retracted state. When used with a multi-stage aerospace vehicle, such as a two-stage hypersonic vehicle, this nose cone may reduce the overall length of the vehicle when the two stages are attached together.

The nose cone takes into account that simply using a fairing between the stages of a multi-stage aerospace vehicle to reduce drag may increase the overall length of the vehicle more than desired. Further, with this type of configuration, additional weight may need to be added to compensate for the increased length of the connections between the different stages. This additional weight may affect the structural dynamics of the aerospace vehicle in an undesired manner. Additionally, the fairing may interfere with the performance of the engines of one of the stages.

Further, the nose cone takes into account that it may be desirable to stow the nose cone within a cavity of the second stage during the initial portion of the flight. However, the cavity may also increase the overall length of the vehicle more than desired.

Consequently, the nose cone described in the figures below allows for the nose cone to be collapsed for stowage during the initial portion of the flight and then expanded once the stages separate. This collapsing and expanding of the nose cone may be performed in a manner that maintains the structural integrity of the nose cone over time and allows for the use of special coatings designed for hypersonic flight.

Further, this type of nose cone may be formed in a manner that allows the nose cone to be reused. In other words, the collapsing and expanding of the nose cone may be performed repeatedly. In some cases, the nose cone may be reusable with respect to multiple aerospace vehicles. In other words, this type of nose cone may be removable and reusable.

Figure 1:
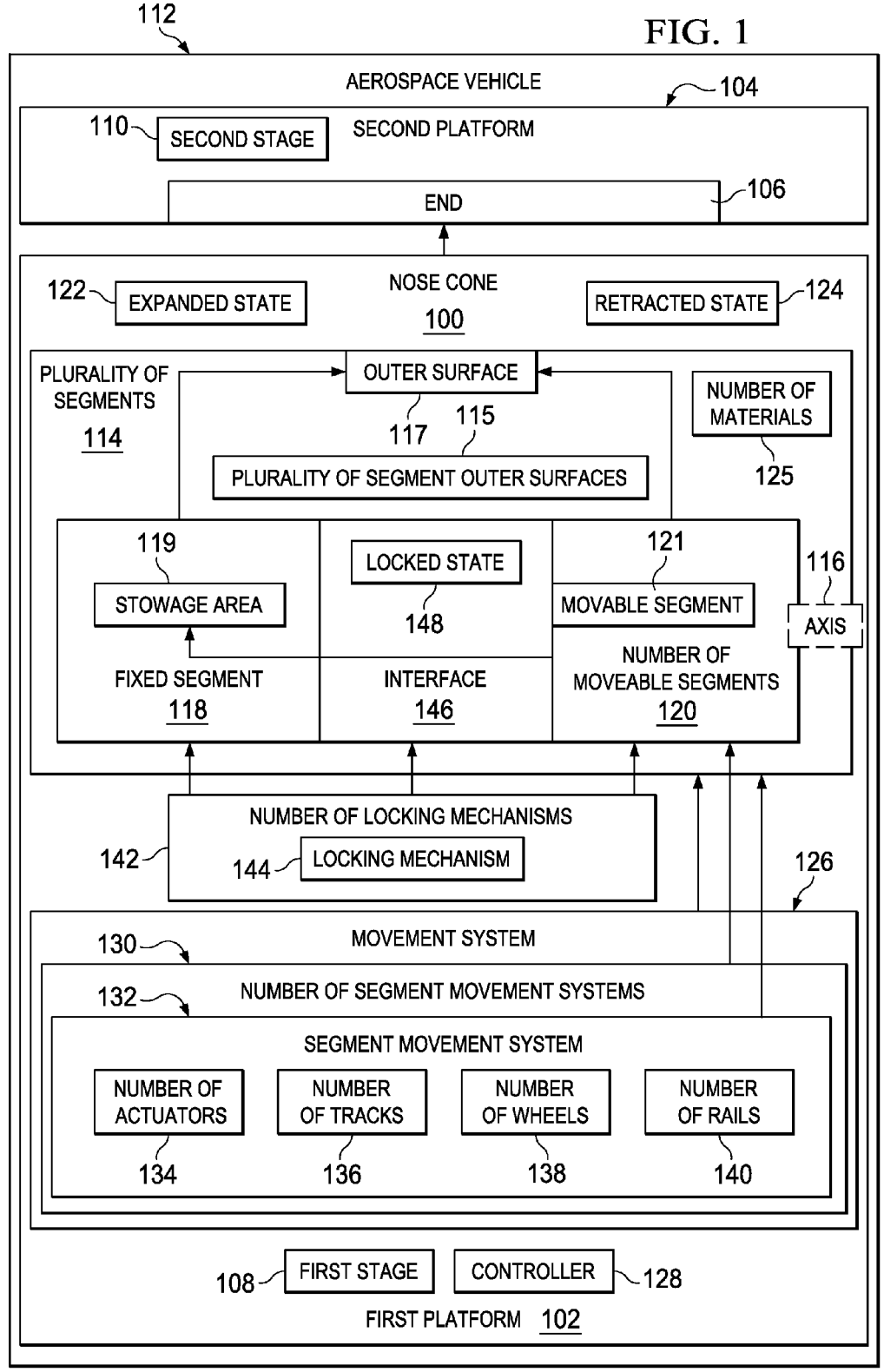
FIG. 1 is an illustration of a nose cone in the form of a block diagram in accordance with an illustrative example.

Referring now to the figures and, in particular, with reference to FIG. 1, an illustration of a nose cone is depicted in the form of a block diagram in accordance with an illustrative example. As depicted, nose cone 100 may be associated with first platform 102.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

First platform 102 may take a number of different forms. For example, without limitation, first platform 102 may be an aircraft, an unmanned aerial vehicle (UAV), a rocket, a missile, a shuttle, a booster, or some other type of aerial or space platform.

In some cases, first platform 102 may be associated with second platform 104. Second platform 104 may take a number of different forms. For example, without limitation, second platform 104 may be an aircraft, an unmanned aerial vehicle (UAV), a rocket, a missile, a shuttle, a booster, or some other type of aerial or space platform.

In one illustrative example, nose cone 100 of first platform 102 may be stowed in a manner that allows a portion of nose cone 100 to be attached to end 106 of second platform 104. For example, first platform 102 and second platform 104 may be first stage 108 and second stage 110, respectively, of aerospace vehicle 112. Aerospace vehicle 112 may also be referred to as a multi-stage aerospace vehicle. Depending on the implementation, aerospace vehicle 112 may be a hypersonic vehicle capable of hypersonic flight.

As used herein, a "nose cone," such as nose cone 100, may not need to have a conical shape. The term "nose cone" is used to refer to the nose portion of an aerial platform or space platform. A nose cone, such as nose cone 100, may take any number of shapes depending on the implementation.

Nose cone 100 may be configured for stowage during the initial portion of the flight of aerospace vehicle 112 when first stage 108 and second stage 110 are attached. In particular, nose cone 100 may be collapsed for stowage. Nose cone 100 may then be expanded and deployed when first stage 108 is separated from second stage 110 during flight.

As depicted, nose cone 100 may be comprised of plurality of segments 114. Plurality of segments 114 may be aligned with respect to axis 116 within selected tolerances. When the cross-sectional shape of each of plurality of segments 114 is similar, plurality of segments 114 may be considered concentrically aligned with axis 116 within selected tolerances. In this manner, axis 116 may be a shared center axis through plurality of segments 114.

As used herein, "within selected tolerances," with respect to the concentric alignment of plurality of segments 114, means that the center axis for one or more of plurality of segments 114 may be offset and/or angled from the center axis of one or more other segments in plurality of segments 114. However, this offset may be within some allowable threshold.

Plurality of segments 114 may have plurality of segment outer surfaces 115 that form outer surface 117 of nose cone 100. Plurality of segments 114 may include two segments, three segments, four segments, six segments or some other number of segments.

As depicted, plurality of segments 114 may include fixed segment 118 and number of moveable segments 120. As used herein, a "number of" items means one or more items. In this manner, number of moveable segments 120 may be one or more moveable segments.

In one illustrative example, fixed segment 118 may be formed by a portion of the body of first platform 102. For example, the body of first platform 102 may have a cylindrical shape that tapers at one end. Fixed segment 118 may be the tapered portion of the body. Of course, in other illustrative examples, fixed segment 118 may be considered separate from and extending from the body of first platform 102.

In this illustrative example, fixed segment 118 forms stowage area 119. Stowage area 119 may be the hollow portion of fixed segment 118 within which number of moveable segments 120 may be stowed. When number of moveable segments 120 is stowed within stowage area 119 of fixed segment 118, nose cone 100 is in retracted state 124.

Number of moveable segments 120 may be moved out of stowage area 119 to move nose cone 100 into expanded state. In particular, number of moveable segments 120 may be moved relative to fixed segment 118 such that number of moveable segments 120 may be completely out of stowage area 119.

In this manner, at least one of plurality of segments 114 may be moveable such that nose cone 100 may be moved between expanded state 122 and retracted state 124. When nose cone 100 is in expanded state 122, outer surface 117 of nose cone 100 is formed such that outer surface 117 is smooth, continuous, and uninterrupted.

As used herein, outer surface 117 being "smooth" means that undesired protrusions or undesired depressions are not present in outer surface 117. Further, outer surface 117 may be "continuous" and "uninterrupted" by not having any undesired breaks or other discontinuities in outer surface 117. More specifically, when nose cone 100 is in expanded state 122, outer surface 117 may appear to be a single surface, rather than a combination of the outer surfaces of plurality of segments 114. In this manner, excess drag generated during flight may be reduced.

Movement system 126 may be associated with nose cone 100 and used to move nose cone 100 between expanded state 122 and retracted state 124. In one illustrative example, movement system 126 may be controlled by controller 128 onboard first platform 102. In some cases, controller 128, or some portion of controller 128 may be located onboard second platform 104.

Controller 128 may be implemented in a number of different ways. In one illustrative example, controller 128 may take the form of a mechanism comprised of one or more levers. An operator, human or robotic, may be used to operate these one or more levers in order to control movement system 126. In some cases, controller 128 may be implemented using hardware, software, or a combination of the two. For example, controller 128 may be implemented using a computer system comprised of one or more computers that may be in communication with each other. Controller 128 may be used to generate commands that are used to control movement system 126.

As depicted, movement system 126 may be comprised of number of segment movement systems 130. In this illustrative example, each of number of segment movement systems 130 moves a corresponding segment in plurality of segments 114 relative to at least one other segment in plurality of segments 114. As one illustrative example, each of number of segment movement systems 130 may move a corresponding moveable segment in number of moveable segments 120 relative to fixed segment 118.

Segment movement system 132 is an example of one of number of segment movement systems 130. Moveable segment 121 is an example of one of number of moveable segments 120. In this illustrative example, segment movement system 132 may be used to move moveable segment 121 relative to fixed segment 118 in a direction substantially parallel to axis 116. Moveable segment 121 may be moved towards fixed segment 118 when nose cone 100 is collapsed and moved into retracted state 124. Moveable segment 121 may be moved away from fixed segment 118 when nose cone 100 is extended and moved into expanded state 122.

Segment movement system 132 may be implemented in a number of different ways. For example, segment movement system 132 may include number of actuators 134, number of tracks 136, number of wheels 138, number of rails 140, and/or other types of devices. In some cases, segment movement system 132 may be a system that controls the movement of second segment 120 using only air pressure.

When nose cone 100 is moved into expanded state 122, number of locking mechanisms 142 may be used to lock nose cone 100 in expanded state 122. In some cases, when nose cone 100 is moved into retracted state 124, number of locking mechanisms 142 may also be used to lock nose cone 100 in retracted state 124. Depending on the implementation, controller 128 may be used to control number of locking mechanisms 142.

Each of number of locking mechanisms 142 may be used to lock a corresponding segment in plurality of segments 114 in place. For example, each locking mechanism in number of locking mechanisms 142 may be used to lock a corresponding moveable segment in number of moveable segments 120 such that this corresponding moveable segment does not move.

Locking mechanism 144 is an example of one of number of locking mechanisms 142. Locking mechanism 144 may be used to lock moveable segment 121 in place once moveable segment 121 has moved away from fixed segment 118 as far as is allowed. In this manner, locking mechanism 144 may lock interface 146 between fixed segment 118 and moveable segment 121 into locked state 148 such that moveable segment 121 may not be moved relative to fixed segment 118 at an undesired time. For example, locking mechanism 144 may lock interface 146 into locked state 148 until commands are received from controller 128 to unlock interface 146 out of locked state 148.

Each of plurality of segments 114 may be comprised of number of materials 125. Number of materials 125 may include, for example, without limitation, any number of composite materials, metal materials, other types of material, or any combination thereof. The composite materials that may be used include, but are not limited to, a graphite epoxy material, a carbon-carbon material, a metal matrix composite material, silicon carbide reinforced titanium, a ceramic matrix composite material, and other types of composite materials. The metal materials that may be used include, but are not limited to, titanium, aluminum, a metal alloy, and other types of metals.

Number of materials 125 may be selected such that each of plurality of segments 114 is substantially rigid. Movement system 126 may be implemented in a manner that allows nose cone 100 to be moved between expanded state 122 and retracted state 124 without affecting the structural integrity of each of plurality of segments 114 in an undesired manner.

In some cases, number of materials 125 may include a flexible material that allows plurality of segments 114 to be more easily deformed when nose cone 100 is moved between expanded state 122 and retracted state 124. In other cases, number of materials 125 may include a brittle material, such as, for example, without limitation, a ceramic material. The brittle material may take the form of a coating that is applied to at least one of plurality of segment outer surfaces 115. Movement system 126 may be implemented in a manner that allows nose cone 100 to be moved between expanded state 122 and retracted state 124 without affecting these brittle coatings in an undesired manner.

In this manner, nose cone 100 may be collapsed into retracted state 124 for stowage when first stage 108 and second stage 110 of aerospace vehicle 112 are attached. This type of configuration for nose cone 100 may allow the length of nose cone 100 to be reduced such that overall length of aerospace vehicle 112 when first stage 108 and second stage 110 are attached is also reduced.

Further, nose cone 100 may be expanded into expanded state 122 when first stage 108 and second stage 110 are separated in a manner that does not affect the aerodynamic performance of first stage 108 in an undesired manner. In expanded state 122, nose cone 100 may have a smooth, continuous, and uninterrupted surface that allows for reduced drag and improved aerodynamic performance.

The illustration of nose cone 100 in FIG. 1 is not meant to imply physical or architectural limitations to the manner in which an illustrative example may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative example.

For example, as described above, nose cone 100 may be collapsed into retracted state 124 for stowage during flight of aerospace vehicle 112 when first stage 108 and second stage 110 are attached to each other. However, nose cone 100 also may be moved into retracted state 124 when first stage 108 is on ground, whether or not first stage 108 is attached to second stage 110.

Different types of equipment may be used to move nose cone 100 into retracted state 124 in addition to or in place of movement system 126 when first stage 108 is on ground. As one illustrative example, heating and cooling equipment may be used at the interface between two segments, one of which is larger than the other.

For example, the heating and cooling equipment may be used at interface 146 between fixed segment 118 and moveable segment 121. At least a portion of fixed segment 118 extending from interface 146 may be heated and at least a portion of moveable segment 121 extending from interface 146 may be cooled. This heating may allow the portion of fixed segment 118 to be expanded and the cooling may allow the portion of moveable segment 121 to be contracted. In this manner, the smaller segment, moveable segment 121, may be more easily moved into the larger segment, fixed segment 118.

Figure 2A:
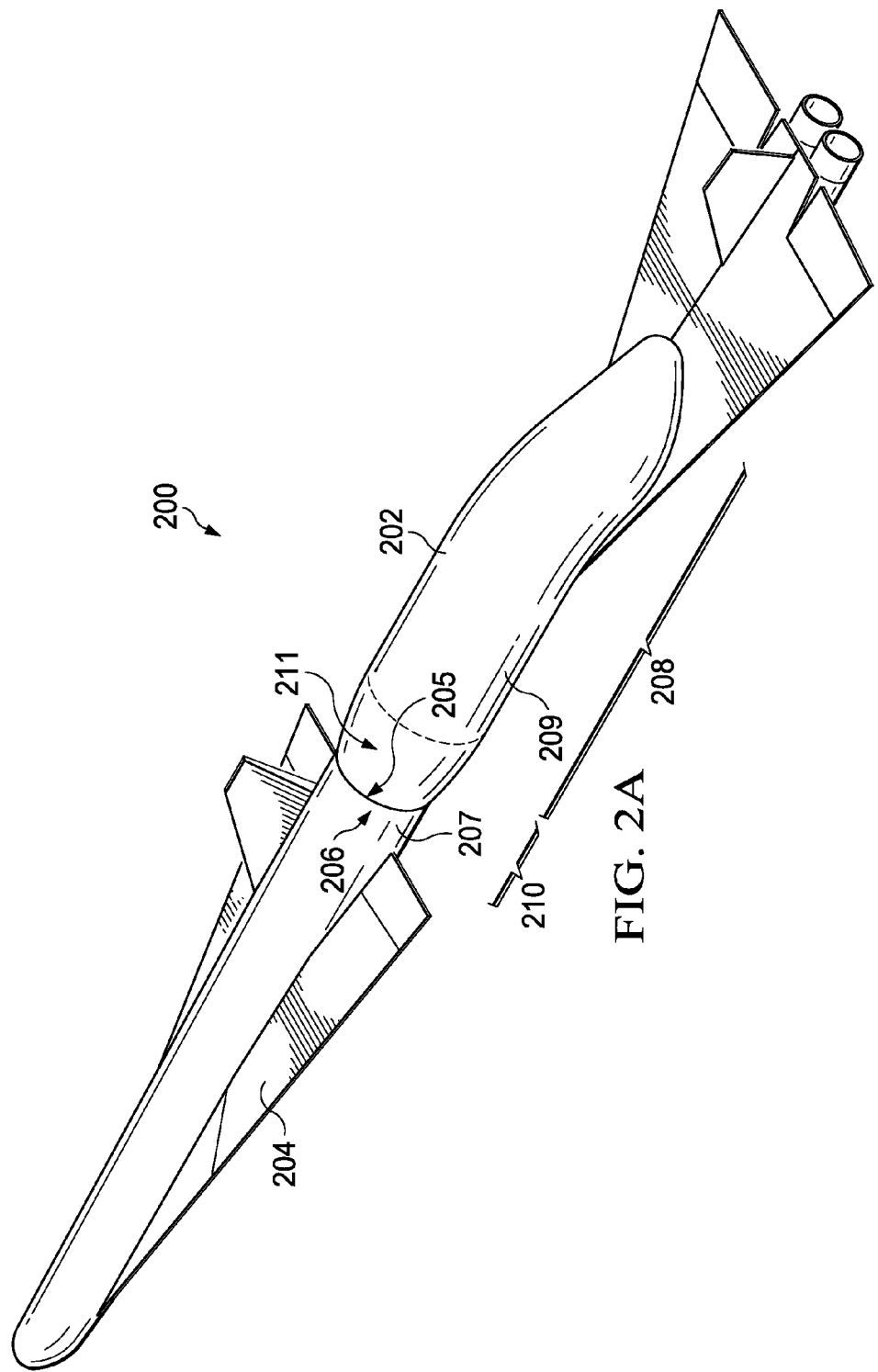
FIGS. 2A-2D are illustrations of a process by which the stages of a two-stage hypersonic vehicle are separated in accordance with an illustrative example.

With reference now to FIGS. 2A-2D, illustrations of a process by which the stages of a two-stage hypersonic vehicle are separated are depicted in accordance with an illustrative example. In FIG. 2A, two-stage hypersonic vehicle 200 may be an example of one implementation for aerospace vehicle 112 in FIG. 1.

As depicted, two-stage hypersonic vehicle 200 comprises first stage 202 and second stage 204. First stage 202 has nose cone 206 associated with body 208 of first stage 202. Nose cone 206 is an example of one implementation for nose cone 100 in FIG. 1. In this illustrative example, nose cone 206 is comprised of a plurality of segments, but only fixed portion 210 is seen in FIG. 2A.

Nose cone 206 has been collapsed into retracted state 211 for stowage while first stage 202 is attached to second stage 204 during the initial portion of the flight of two-stage hypersonic vehicle 200. Retracted state 211 is an example of one implementation for retracted state 124 in FIG. 1.

In this illustrative example, interface 205 is formed between outer surface 207 of second stage 204 and outer surface 209 of first stage 202 when first stage 202 is attached to second stage 204. Nose cone 206 of first stage 202 may be stowed in a manner such that interface 205 does not affect the aerodynamic performance of two-stage hypersonic vehicle 200 in an undesired manner.

Figure 2B:
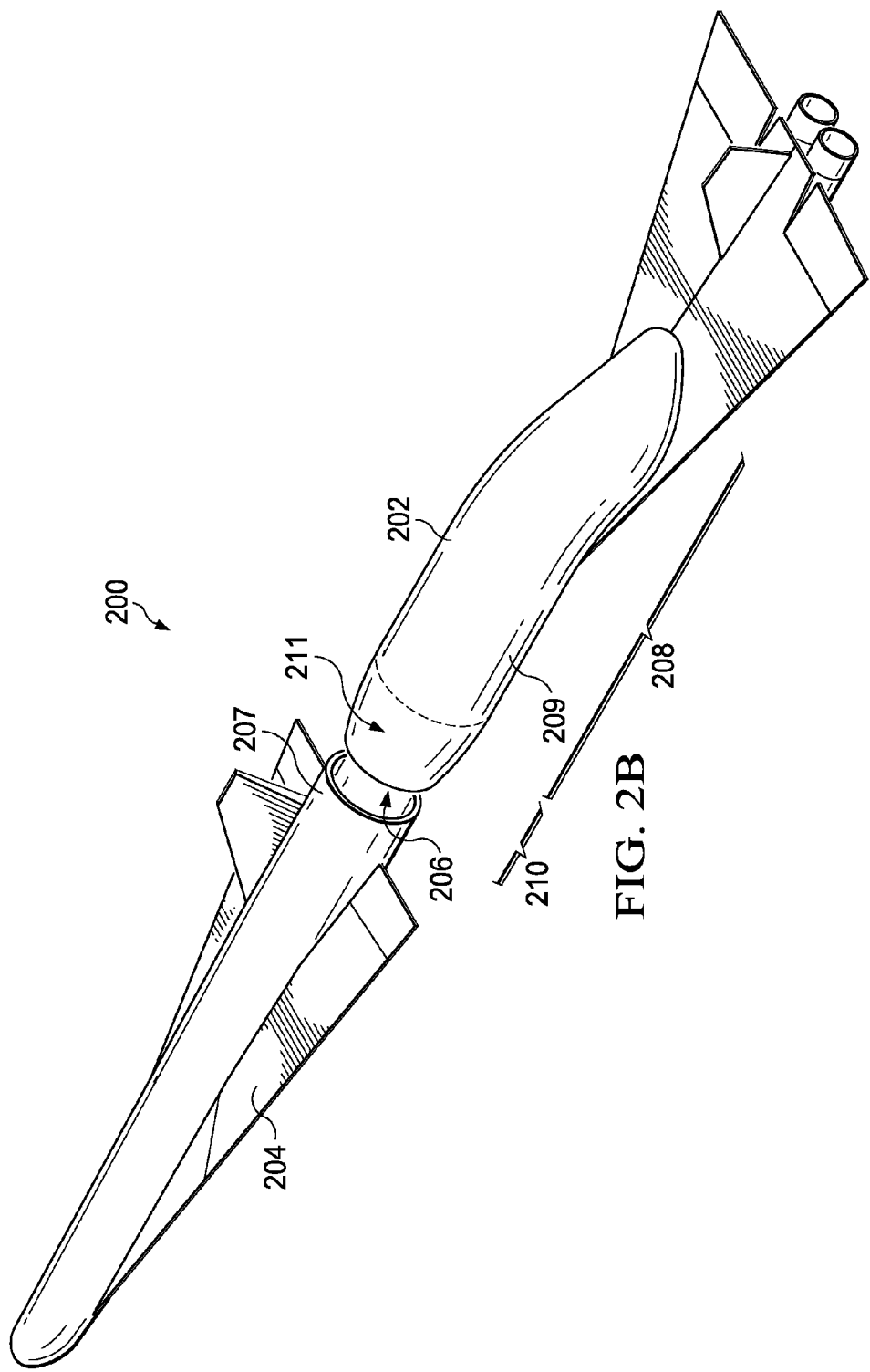

In FIG. 2B, first stage 202 has begun to separate from second stage 204. Nose cone 206 is still in retracted state 211.

Figure 2C:
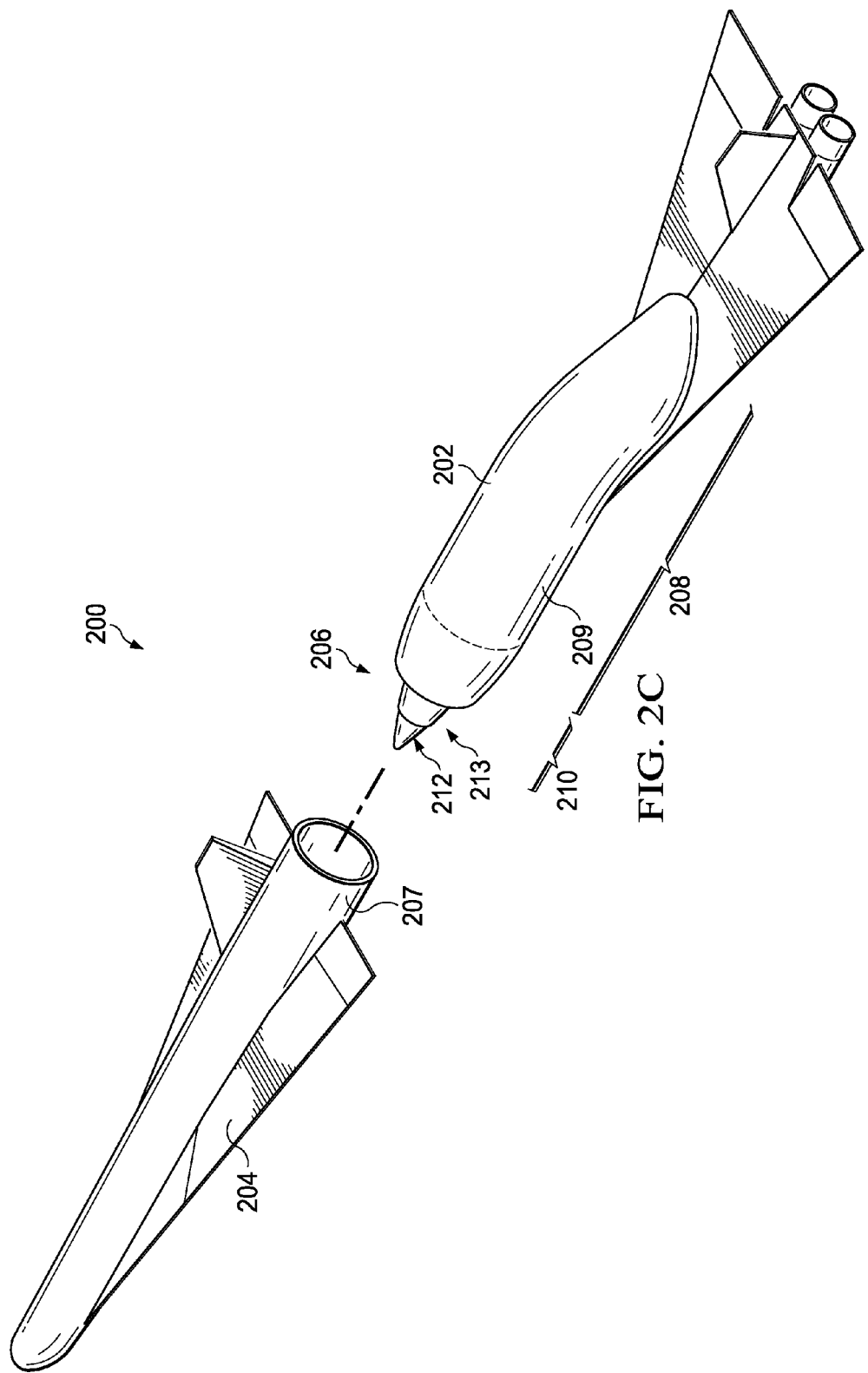

In FIG. 2C, first stage 202 has completely separated from second stage 204 and nose cone 206 has moved out of the retracted state. In particular, nose cone 206 has been extended into partially expanded state 212. More specifically, moveable portion 213 of nose cone 206, which may include one or more moveable segments, has been moved out of a stowage area (not shown) within fixed portion 210.

Figure 2D:
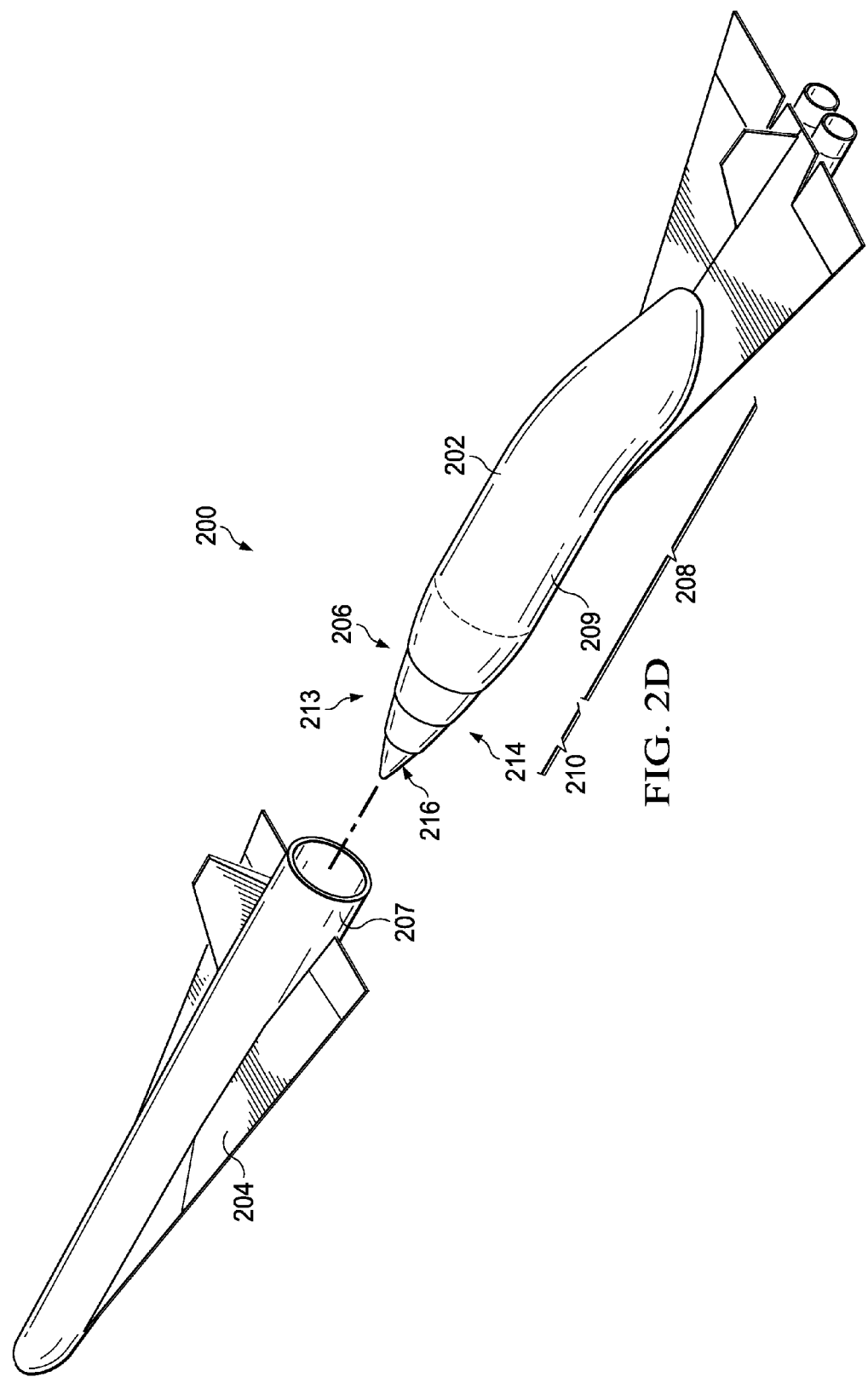

In FIG. 2D, nose cone 206 has been fully expanded into expanded state 214. Expanded state 214 is an example of one implementation for expanded state 122 in FIG. 1. Each of the segments in moveable portion 213 has been completely moved out of the stowage area (not shown) within fixed portion 210. Outer surface 216 of nose cone 206 may be smooth, continuous, and uninterrupted when nose cone 206 is in expanded state 214.

In these illustrative examples, the rate at which the different segments in moveable portion 213 are moved out of the stowage area within fixed portion 210 may be determined by aerodynamic requirements and/or other types of requirements. For example, it may be desirable to begin moving one or more of the segments in moveable portion 213 during the process of separating first stage 202 and second stage 204. Nose cone 206 may be expanded to utilize the space created between first stage 202 and second stage 204 as these two stages separate such that nose cone 206 is in a configuration ready to accept free-stream aerodynamic loads that may impinge on first stage 202 as first stage 202 and second stage 204 separate.

Figure 3:
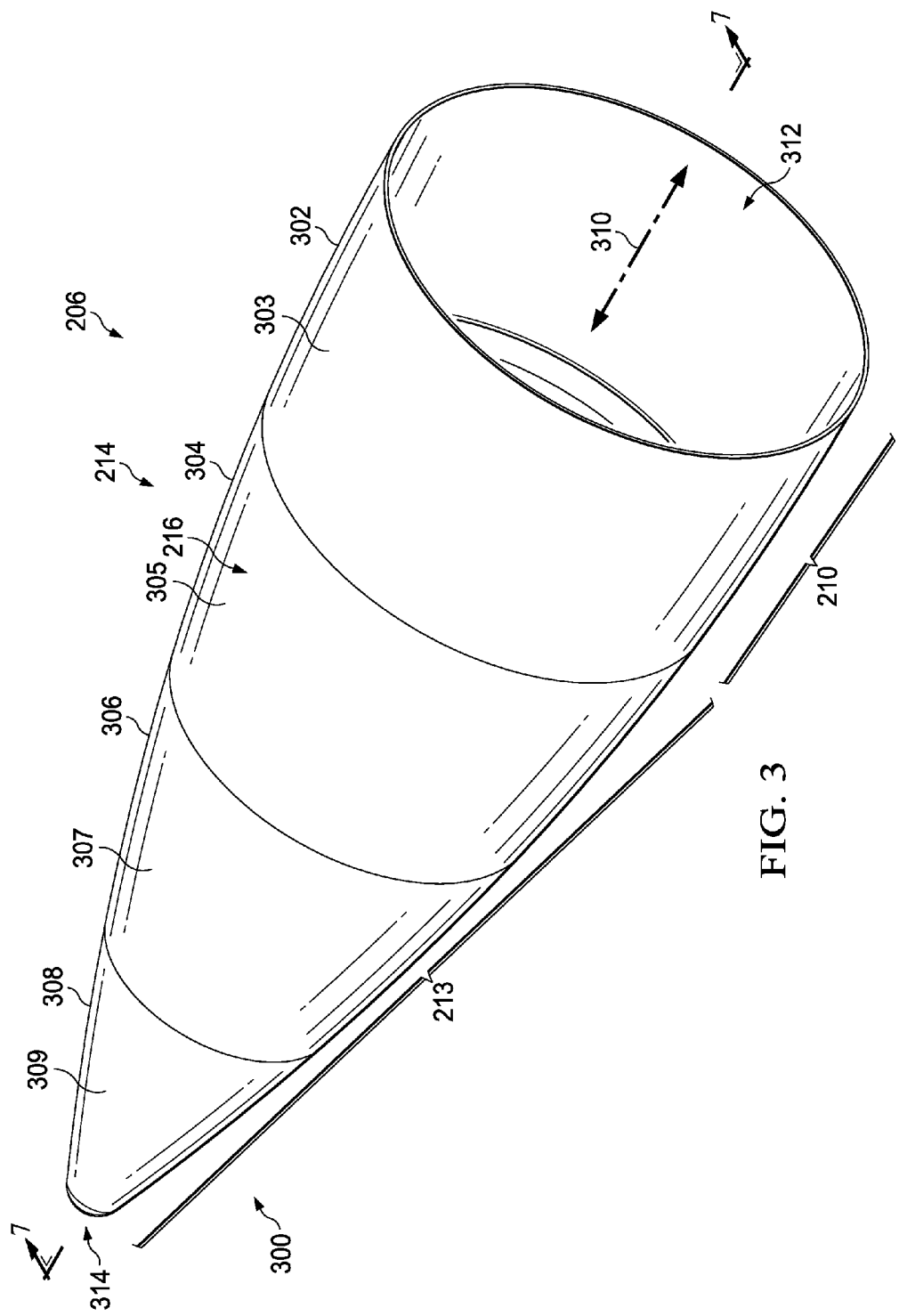
FIG. 3 is an illustration of an isometric view of a nose cone in accordance with an illustrative example.

Turning now to FIG. 3, an illustration of an isometric view of nose cone 206 from FIGS. 2A-D is depicted in accordance with an illustrative example. As depicted, nose cone 206 is comprised of plurality of segments 300. Plurality of segments 300 may be an example of one implementation for plurality of segments 114 in FIG. 1.

Plurality of segments 300 includes segments 302, 304, 306, and 308. Segment 302 is a first segment that forms a base portion of nose cone 206 and is a fixed segment. Segment 302 is an example of one implementation for fixed segment 118 in FIG. 1. Segment 304 is a second segment and segment 306 is a third segment. Segment 308 is a fourth segment that forms a tip portion of nose cone 206. Segments 304, 306, and 308 are moveable segments in this illustrative example. Segments 304, 306, and 308 are an example of one implementation for number of moveable segments 120 in FIG. 1.

Segments 302, 304, 306, and 308 have segment outer surfaces 303, 305, 307, and 309, respectively. Segment outer surfaces 303, 305, 307, and 309 form outer surface 216 of nose cone 206. Segments 302, 304, 306, and 308 are concentrically aligned with axis 310 within selected tolerances, in this illustrative example.

As depicted, nose cone 206 has first end 312 and second end 314. First end 312 of nose cone 206 is open, while second end 314 of nose cone 206 is closed in this illustrative example.

Figure 4:
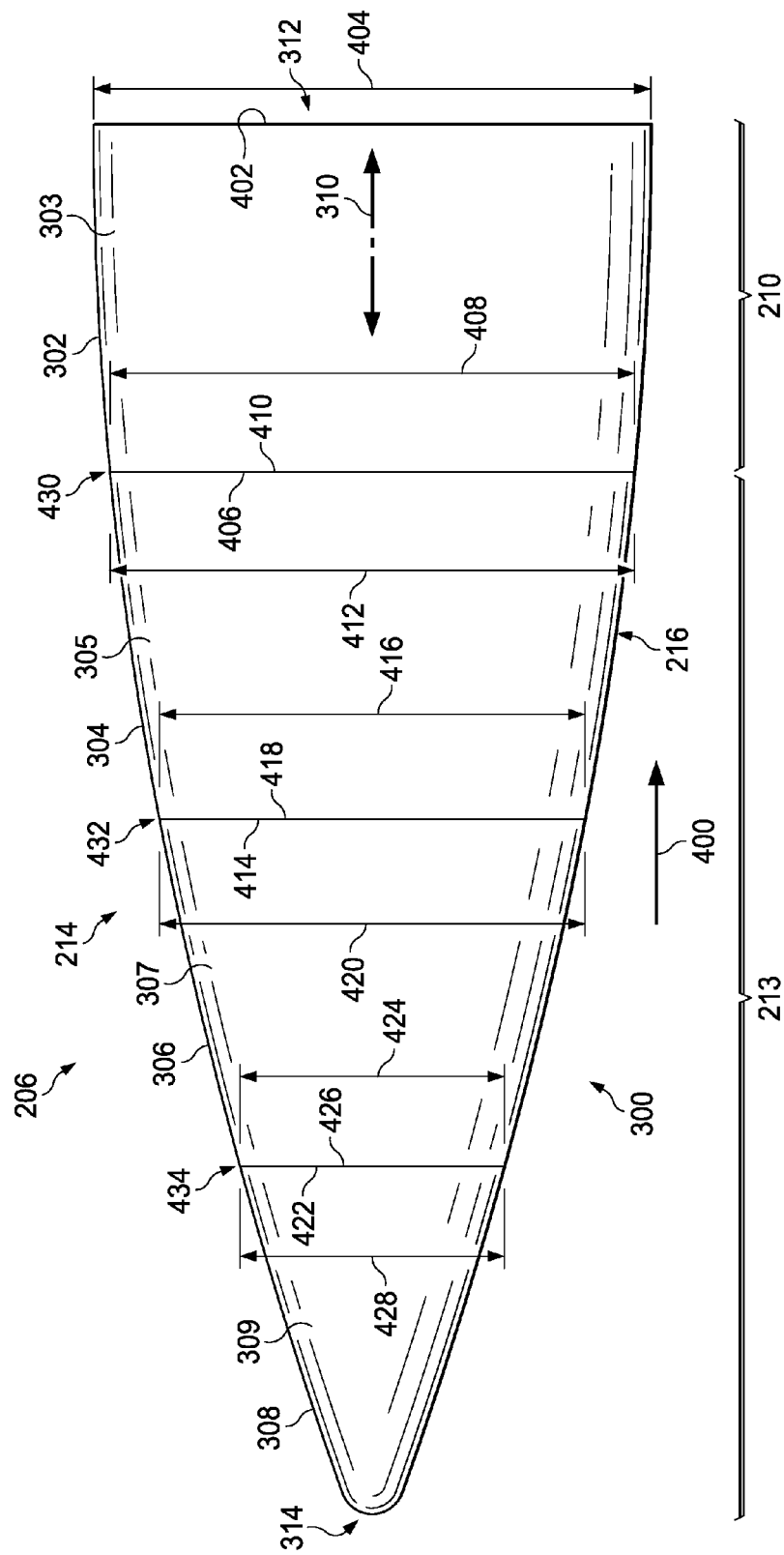
FIG. 4 is an illustration of a side view of a nose cone in accordance with an illustrative example.

With reference now to FIG. 4, an illustration of a side view of nose cone 206 from FIGS. 2-3 is depicted in accordance with an illustrative example. Nose cone 206 is in expanded state 214 in FIG. 4. However, nose cone 206 may be moved into a retracted state by moving segments 304, 306, and 308 in the direction of arrow 400 along axis 310. The shape of each of these segments is selected such that these segments may be nested within segment 302.

For example, end 402 of segment 302 may have diameter 404, while end 406 of segment 302 may have diameter 408. In this illustrative example, end 402 of segment 302 may be located at the portion of body 208 of first stage 202 at which outer surface 209 of first stage 202 begins to taper. End 410 of segment 304 may have diameter 412, while end 414 of segment 304 may have diameter 416. End 418 of segment 306 may have diameter 420, while end 422 of segment 306 may have diameter 424. Further, end 426 of segment 308 may have diameter 428.

In this illustrative example, segments 304, 306, and 308 may be comprised of titanium. Titanium may have sufficient elasticity to allow the diameters of these segments to be reduced sufficiently to allow these segments to be individually and independently moved in the direction of arrow 400. This reduction may be performed using a movement system, such as movement system 126 in FIG. 1.

For example, diameter 412 of end 410 of segment 304 may be reduced such that interface 430 between segment 304 and segment 302 may be unlocked. Similarly, diameter 420 of end 418 of segment 306 may be reduced such that interface 432 between segment 304 and segment 306 may be unlocked. Further, diameter 428 of end 426 of segment 308 may be reduced such that interface 434 between segment 306 and segment 308 may be unlocked.

Additionally, in some cases, the diameters of at least segments 304, 306, and 308 may be increased. In this manner, these segments may be expanded.

Figure 5:
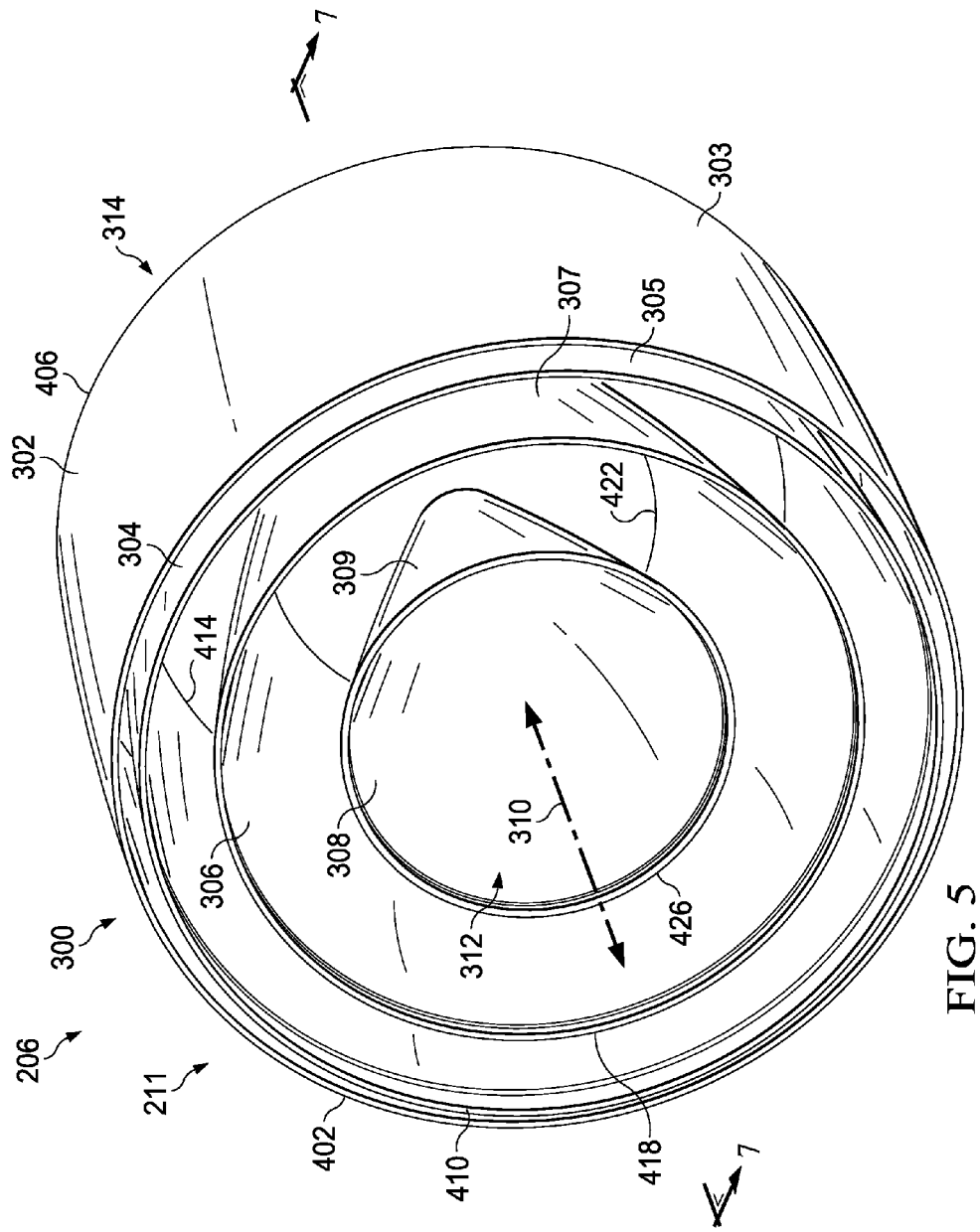
FIG. 5 is an illustration of an isometric end view of a nose cone in a retracted state in accordance with an illustrative example.

With reference now to FIG. 5, an illustration of an isometric end view of nose cone 206 from FIGS. 2-4 in a retracted state is depicted in accordance with an illustrative example. In this illustrative example, nose cone 206 has been moved into retracted state 211. Retracted state 211 is an example of one implementation for retracted state 124 in FIG. 1. This end view of nose cone 206 is seen from first end 312 of nose cone 206.

Figure 6:
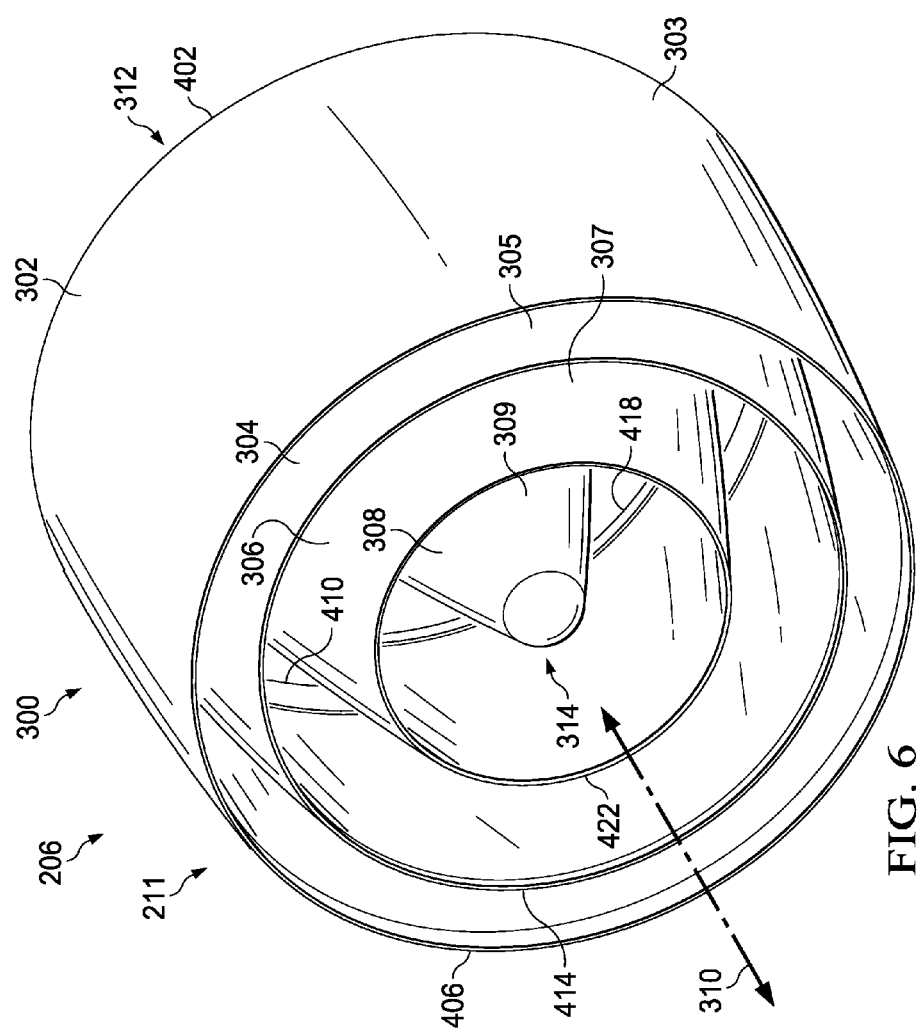
FIG. 6 is an illustration of an isometric end view of a nose cone in a retracted state in accordance with an illustrative example.

With reference now to FIG. 6, an illustration of an isometric end view of nose cone 206 in retracted state 211 from FIG. 5 is depicted in accordance with an illustrative example. In this illustrative example, nose cone 206 is seen from second end 314 of nose cone 206.

Figure 7:
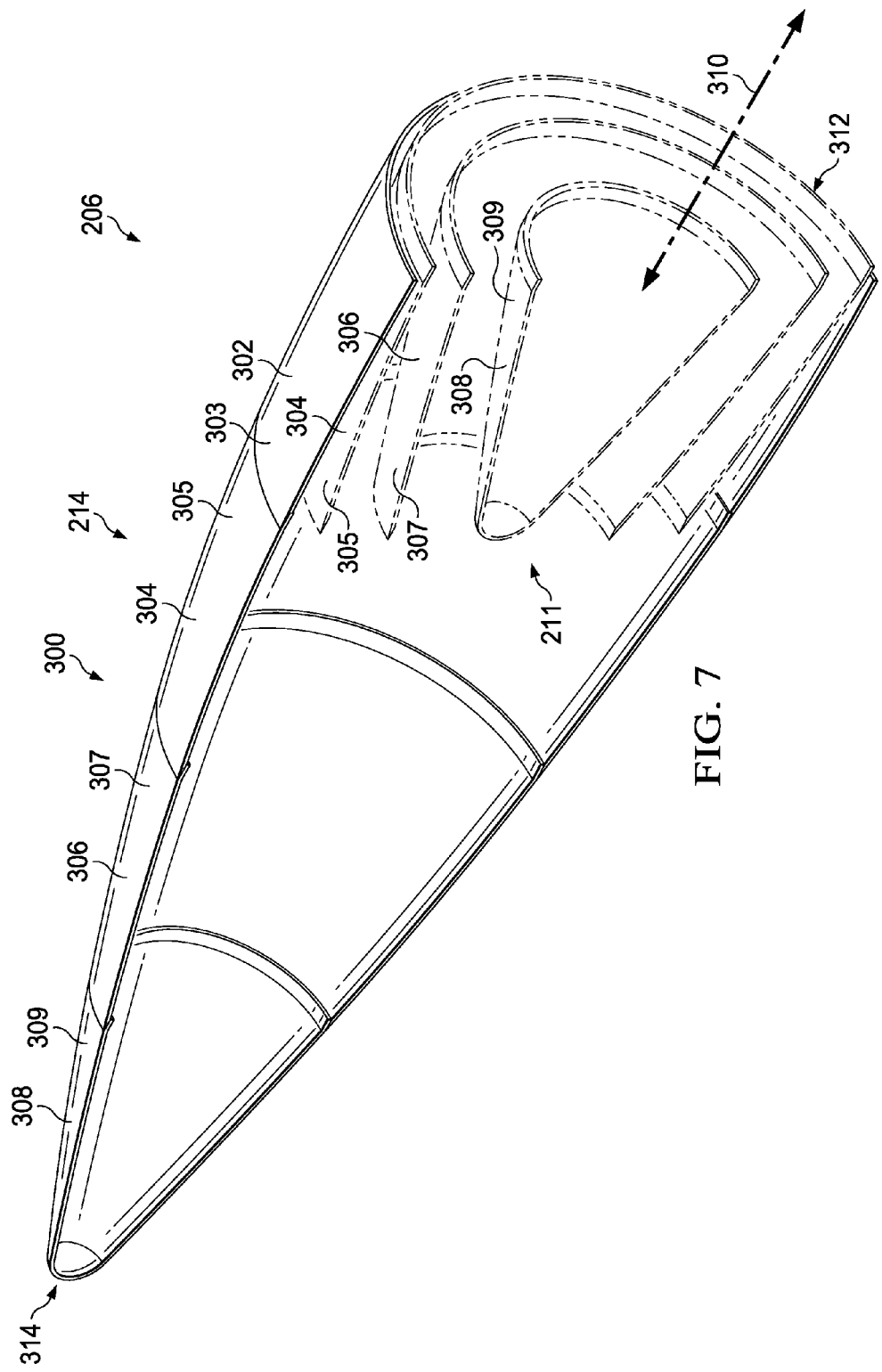
FIG. 7 is an illustration of a cross-sectional view of a nose cone shown in both an expanded state and a retracted state in accordance with an illustrative example.

Turning now to FIG. 7, an illustration of a cross-sectional view of nose cone 206 shown in both expanded state 214 from FIG. 4 and retracted state 211 from FIG. 5 is depicted in accordance with an illustrative example. This cross-sectional view is taken with respect to lines 7-7 in FIG. 3 and lines 7-7 in FIG. 5.

Figure 8:
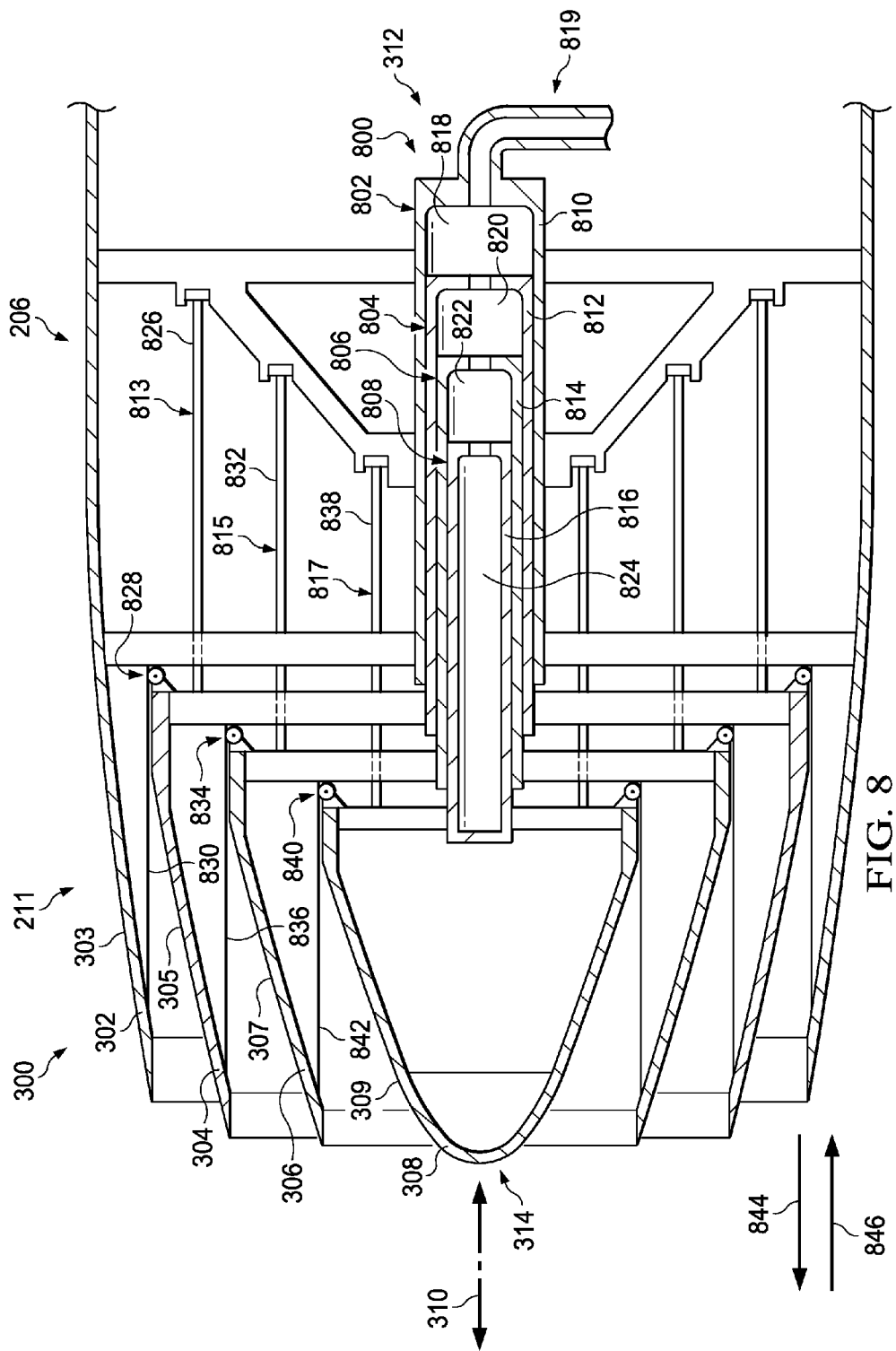
FIG. 8 is an illustration of a cross-sectional side view of a nose cone in a retracted state in accordance with an illustrative example.

With reference now to FIG. 8, an illustration of a cross-sectional side view of nose cone 206 in retracted state 211 from FIG. 5 is depicted in accordance with an illustrative example. In FIG. 8, movement system 800 is seen associated with nose cone 206. Movement system 800 is an example of one implementation for movement system 126 in FIG. 1.

Movement system 800 comprises structure 802 and segment movement systems 804, 806, and 808. As depicted, structure 802 takes the form of housing 810 for segment movement systems 804, 806, and 808. Segment movement systems 804, 806, and 808 include actuators 812, 814, and 816, respectively.

Actuators 812, 814, and 816 may be housed within chamber 818 of structure 802. Actuators 812, 814, and 816 may be hydraulic cylinders nested within structure 802 in this illustrative example. Hydraulic fluid may be pumped into chamber 818 through hydraulic lines 819 and used to move actuators 812, 814, and 816. Hydraulic fluid may also flow into chambers 820, 822, and 824 of actuators 812, 814, and 816, respectively.

An opening (not shown) may be present at the base of each of actuators 812, 814, and 816 to allow the hydraulic fluid to flow between these actuators. The openings may be sized such that each of actuators 812, 814, and 816 may be expanded at a rate that allows each of segments 304, 306, and 308, respectively, to be expanded to full extension at the desired time.

A smaller opening may result in more pressure being applied to the base of a corresponding actuator and less pressure being applied to the chamber of the next actuator nested within the corresponding actuator. A larger opening may result in less pressure being applied to the base of the corresponding actuator and more pressure being applied to the chamber of the next actuator nested within the corresponding actuator.

In some cases, it may be desirable to individually move segments 304, 306, and 308 such that they are sequentially expanded. In other cases, it may be desirable to expand segments 304, 306, and 308 at the same time.

Segments 304, 306, and 308 may be prevented from moving laterally with respect to each other by rollers and tracks. In other words, these rollers and tracks prevent rotation of one segment about axis 310 relative to another segment and translation of one segment relative to another segment in any direction other than the direction substantially parallel to axis 310. For example, segment movement system 804 further includes stopping system 826, roller system 828, and track system 830. Roller system 828 may be comprised of rollers that ride along tracks in track system 830. Roller system 828 and track system 830 prevent segment 304 from translating relative to segment 302 in any direction other than the direction substantially parallel to axis 310 when segment 304 is being moved along axis 310.

Further, stopping system 826 may include a plurality of stoppers. These stoppers may be used to prevent segment 304 from being expanded past some selected position. Stopper 813, 815, and 817 are examples of stoppers in stopping system 826.

Similarly, segment movement system 806 further includes stopping system 832, roller system 834, and track system 836. Segment movement system 808 further includes stopping system 838, roller system 840, and track system 842.

In this manner, movement system 800 may be used to move segments 304, 306, and 308 in the direction of arrow 844 along axis 310 to move nose cone 206 from retracted state 211 in FIG. 5 to expanded state 214 in FIG. 2. Further, movement system 800 may be used to move segments 304, 306, and 308 in the direction of arrow 846 along axis 310 to move nose cone 206 from expanded state 214 in FIG. 2 to retracted state 211 in FIG. 5.

Figure 9:
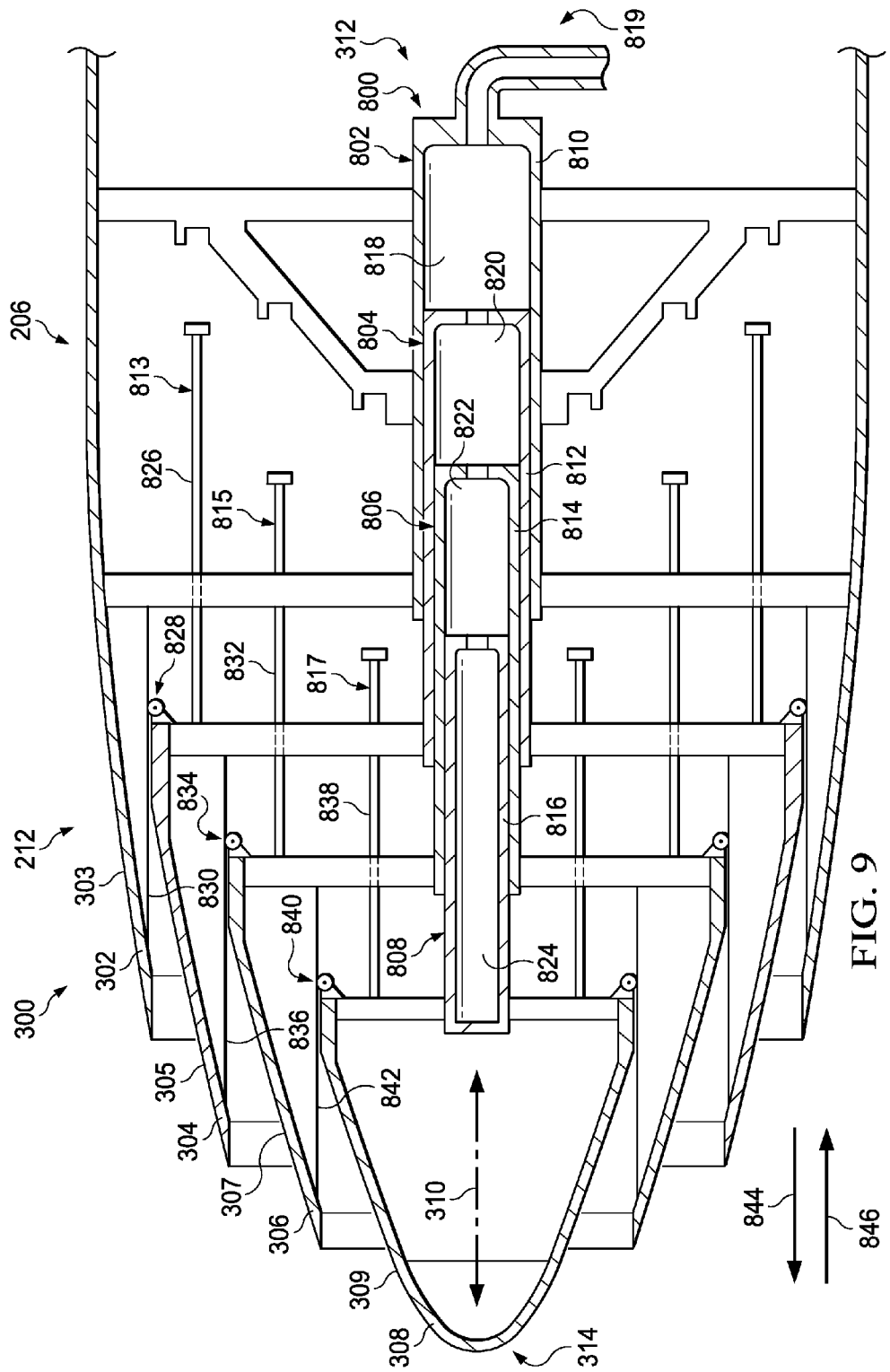
FIG. 9 is an illustration of a cross-sectional side view of a nose cone in a partially expanded state in accordance with an illustrative example.

Turning now to FIG. 9, an illustration of a cross-sectional side view of nose cone 206 from FIG. 8 in partially expanded state 212 is depicted in accordance with an illustrative example. In this illustrative example, segments 304, 306, and 308 have been moved relative to segment 302 such that nose cone 206 is partially expanded. In particular, nose cone 206 is about fifty percent expanded in this example.

Figure 10:
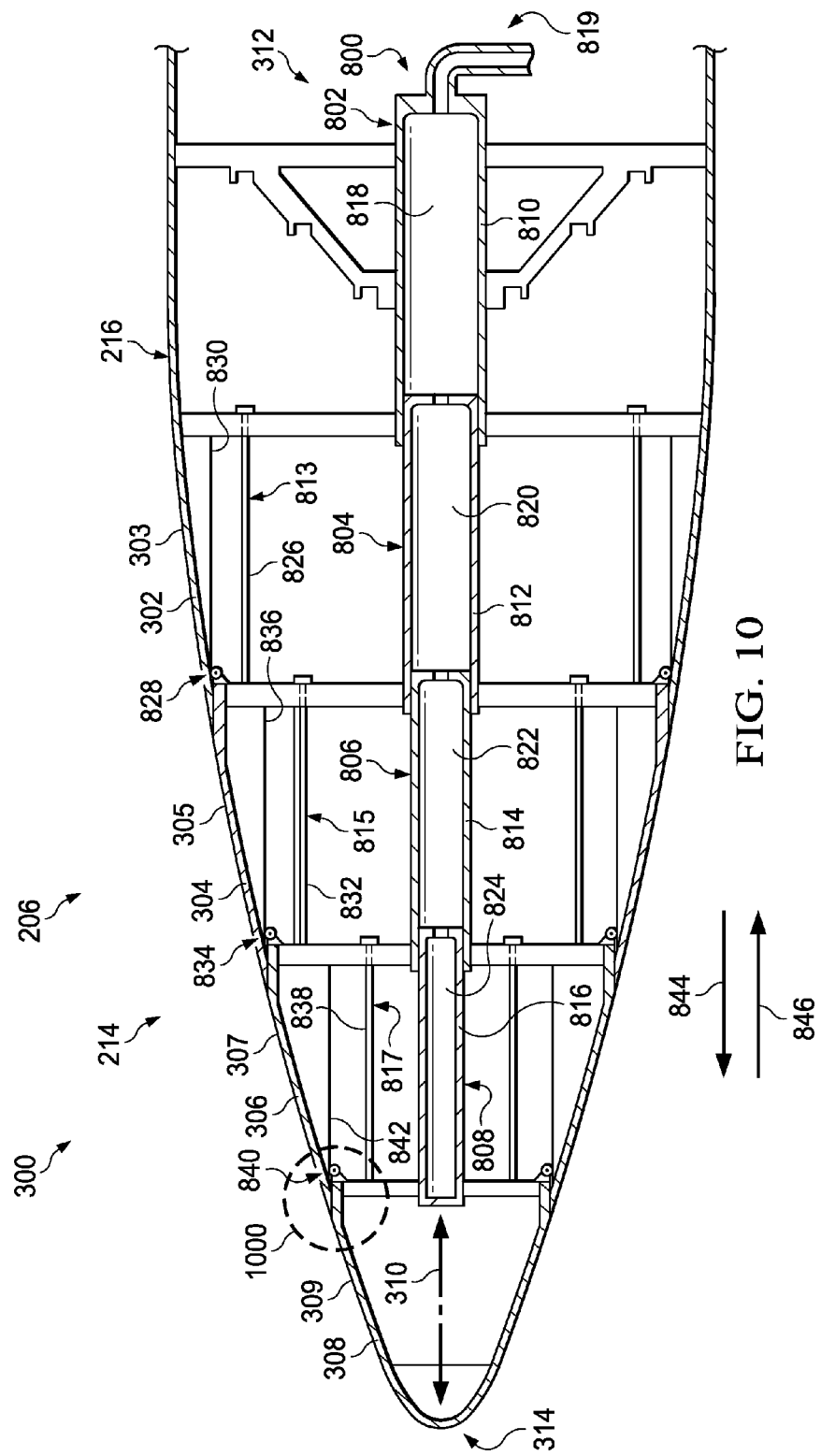
FIG. 10 is an illustration of a cross-sectional side view of a nose cone in a fully expanded state in accordance with an illustrative example.

With reference now to FIG. 10, an illustration of a cross-sectional side view of nose cone 206 from FIGS. 8-9 in a fully expanded state is depicted in accordance with an illustrative example. In this illustrative example, segments 304, 306, and 308 have been moved relative to segment 302 such that nose cone 206 is now expanded and is in expanded state 214. Section 1000 may be described in greater detail in FIG. 12 below.

Figure 11:
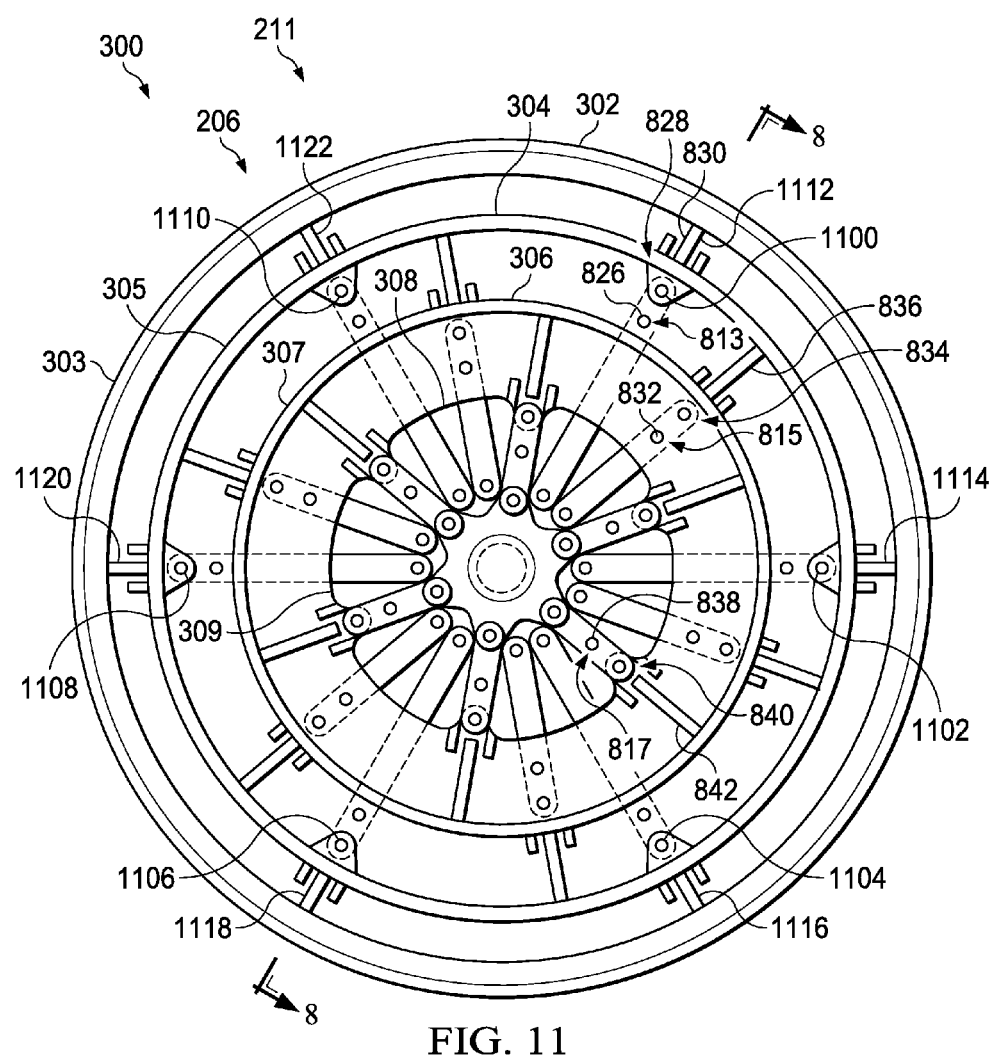
FIG. 11 is an illustration of an end view of a nose cone in accordance with an illustrative example.

With reference now to FIG. 11, an illustration of an end view of nose cone 206 from FIG. 8 is depicted in accordance with an illustrative example. In FIG. 11, nose cone 206 may be in expanded state 214 and is seen from first end 312 of nose cone 206. As depicted, the various roller systems and track systems of the different segment movement systems comprise a plurality of rollers and a plurality of tracks. For example, roller system 828 includes rollers 1100, 1102, 1104, 1106, 1108, and 1110. Track system 830 includes tracks 1112, 1114, 1116, 1118, 1120, and 1122. Rollers 1100, 1102, 1104, 1106, 1108, and 1110 may ride on tracks 1112, 1114, 1116, 1118, 1120, and 1122, respectively.

Figure 12:
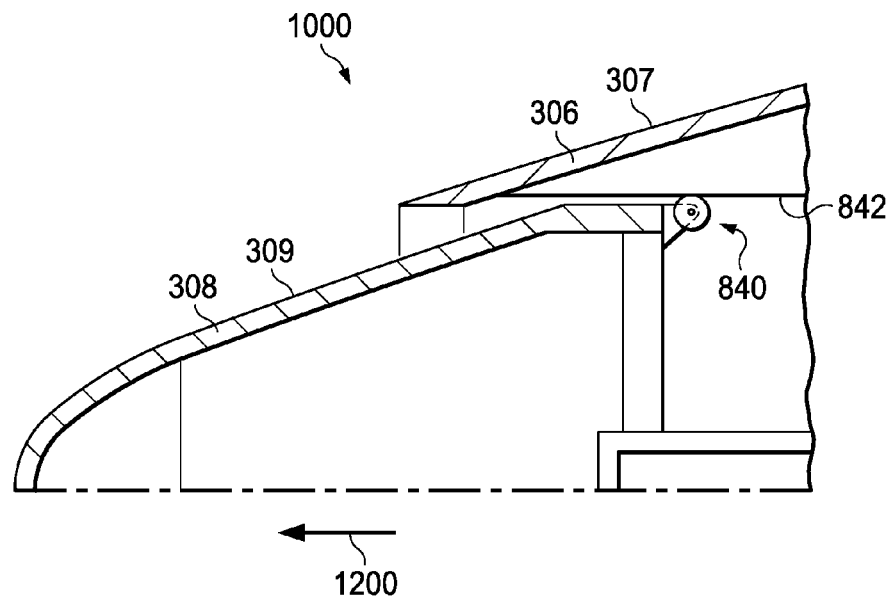
FIG. 12 is an illustration of an enlarged view of a section in accordance with an illustrative example.

Turning now to FIG. 12, an illustration of an enlarged view of section 1000 from FIG. 10 is depicted in accordance with an illustrative example. As depicted, interface 434 between segment 306 and segment 308 as seen in FIG. 4 has not yet been formed. In other words, segment 308 has not been fully expanded. Segment 308 may be moved in the direction of arrow 1200 to become fully expanded.

Figure 13:
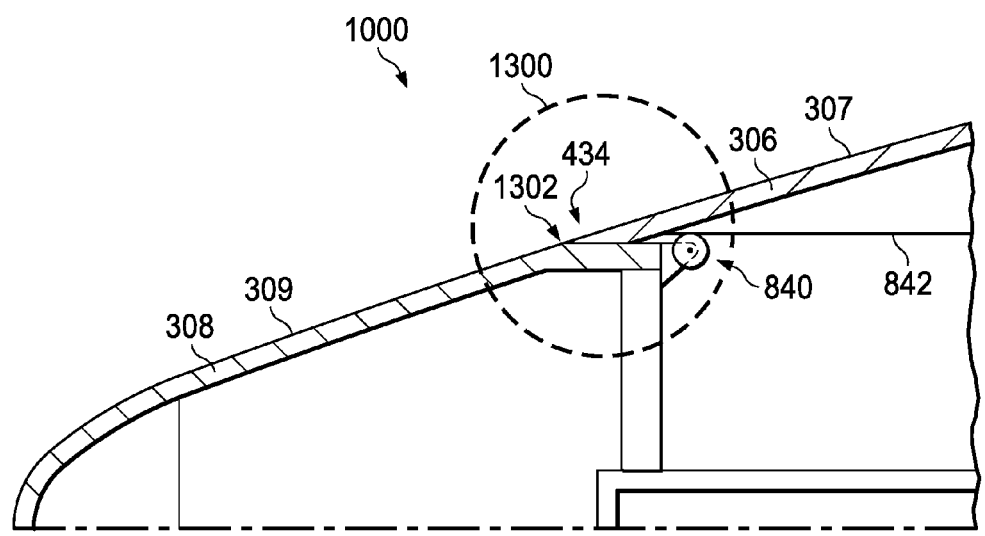
FIG. 13 is an illustration of an enlarged view of a section in accordance with an illustrative example.

With reference now to FIG. 13, an illustration of an enlarged view of section 1000 from FIG. 10 is depicted in accordance with an illustrative example. In this example, segment 308 has been fully expanded and interface 434 has been formed. Section 1300 includes interface 434. Within section 1300, interface 434 may be formed having knife edge 1302. However, other types of interfaces may be formed to avoid this knife-edged condition. Possibilities for these other types of interfaces are described in FIG. 14A, FIG. 14B, and FIG. 14C below.

Figure 14C:
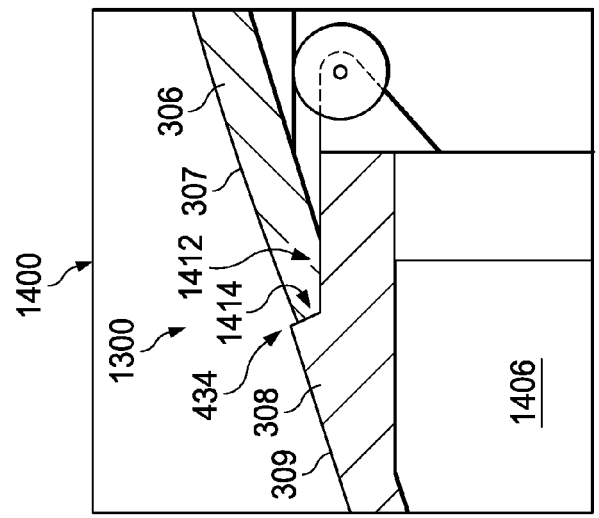
FIG. 14C is an illustration of an enlarged view of a section with a possible configuration for an interface in accordance with an illustrative example.
Figure 14B:
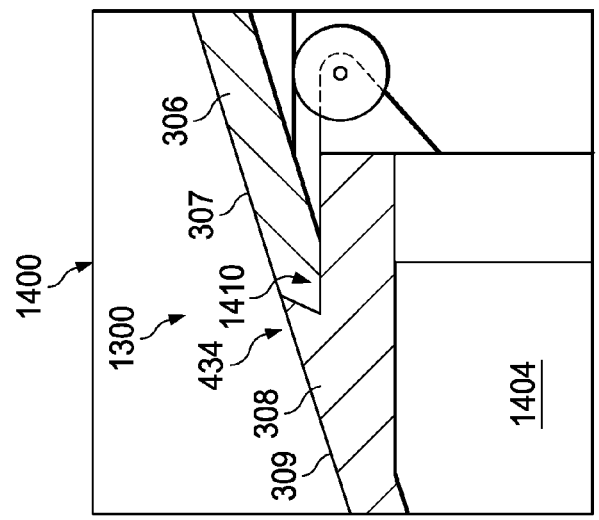
FIG. 14B is an illustration of an enlarged view of a section with a possible configuration for an interface in accordance with an illustrative example.
Figure 14A:
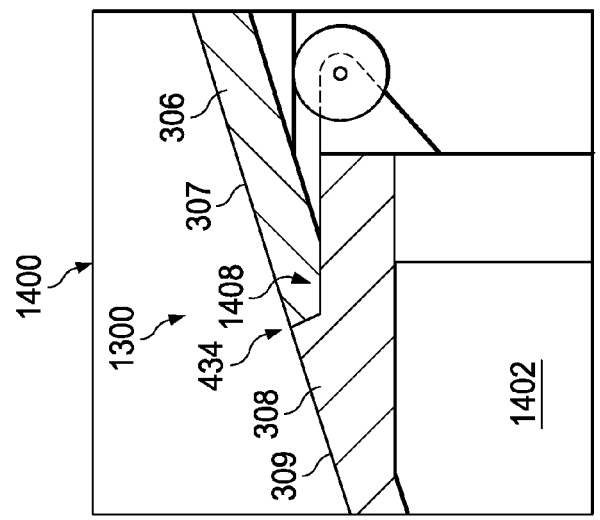
FIG. 14A is an illustration of an enlarged view of a section with a possible configuration for an interface in accordance with an illustrative example.

With reference now to 14A, FIG. 14B, and FIG. 14C, an illustration of an enlarged view of section 1300 from FIG. 13 is depicted with possible configurations for interface 434 in accordance with an illustrative example. Possible configurations 1400 for interface 434 include configuration 1402 as shown in FIG. 14A, configuration 1404 as shown in FIG. 14B, and configuration 1406 as shown in FIG. 14C.

With configuration 1402, a first type of step interface 1408 is formed. Step interface 1408 may be substantially perpendicular to outer surface 216. With configuration 1404, a second type of step interface 1410 is formed. Step interface 1410 may be angled away from the down-wind direction of the air-stream over outer surface 216. This type of interface may reduce the possibility of air being forced within interface 434.

With configuration 1406, a third type of step interface 1412 is formed. With the third type of step interface 1412, an additional step 1414 is created at interface 434.

When these types of configurations are used for interfaces 430, 432, and 434 in FIG. 4, the pressure in actuators 812, 814, and 816 may be reversed such that force is applied in the opposite direction. This force may be used to seal, or close, any gaps at the interfaces between segments. Of course, a gap at the interface formed between two segments may be closed in some other manner. For example, in some cases, sealant, O-rings, and/or other types of seals may be used to ensure that the interface between each pair of segments is sealed.

Figure 15:
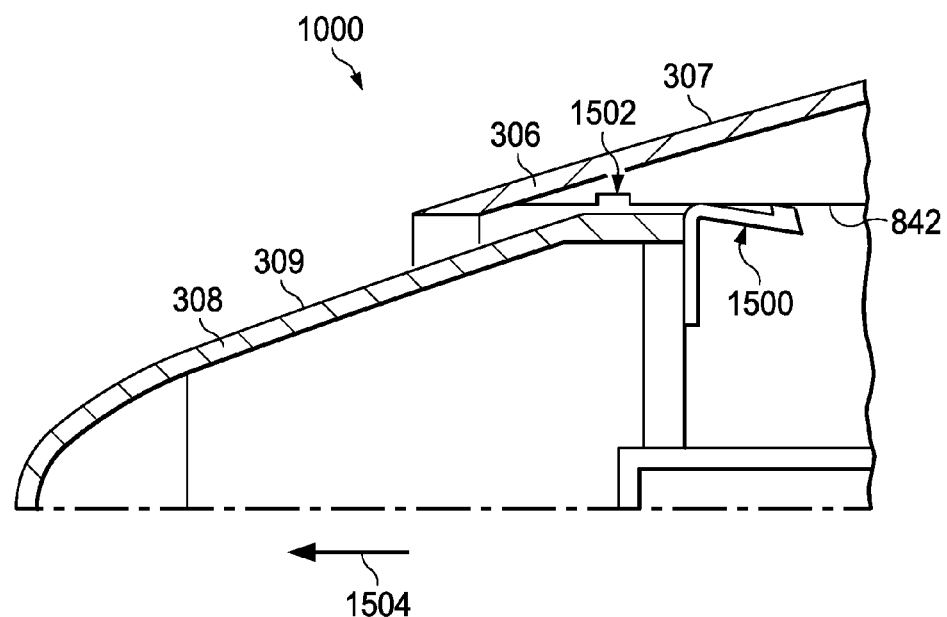
FIG. 15 is an illustration of an enlarged view of a section with a different configuration for an interface in accordance with an illustrative example.

Turning now to FIG. 15, an illustration of an enlarged view of section 1000 from FIG. 10 with a different configuration for interface 434 is depicted in accordance with an illustrative example. As depicted, clip 1500 and groove 1502 may be used to form a "snap-fit" between segment 308 and segment 306. Segment 308 may be moved in the direction of arrow 1504 until clip 1500 snaps into groove 1502.

Figure 16:
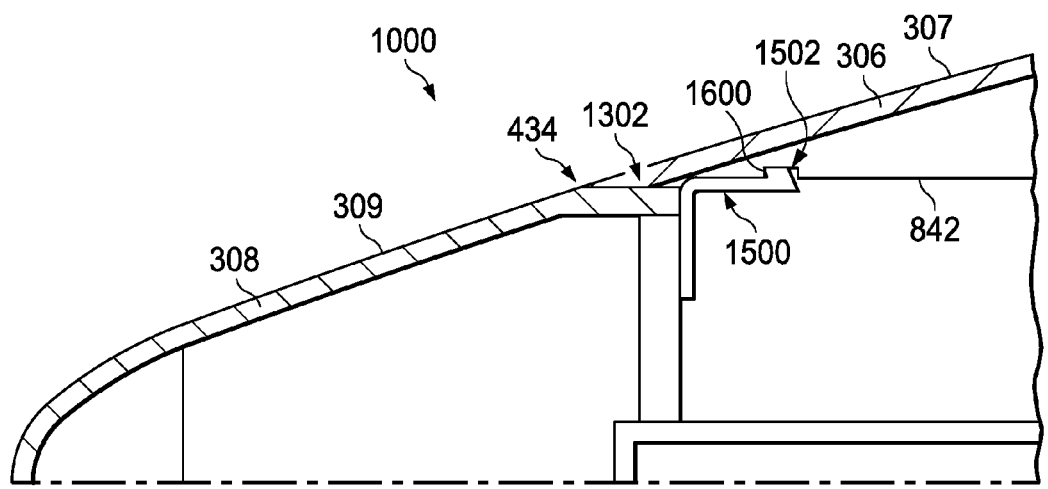
FIG. 16 is an illustration of an enlarged view of a section with a different configuration for an interface in accordance with an illustrative example.

With reference now to FIG. 16, an illustration of an enlarged view of section 1000 from FIG. 10 with the different configuration for interface 434 from FIG. 15 is depicted in accordance with an illustrative example. Interface 434 has been formed with a "snap-fit." End 1600 of clip 1500 has snapped into groove 1502.

Figure 17:
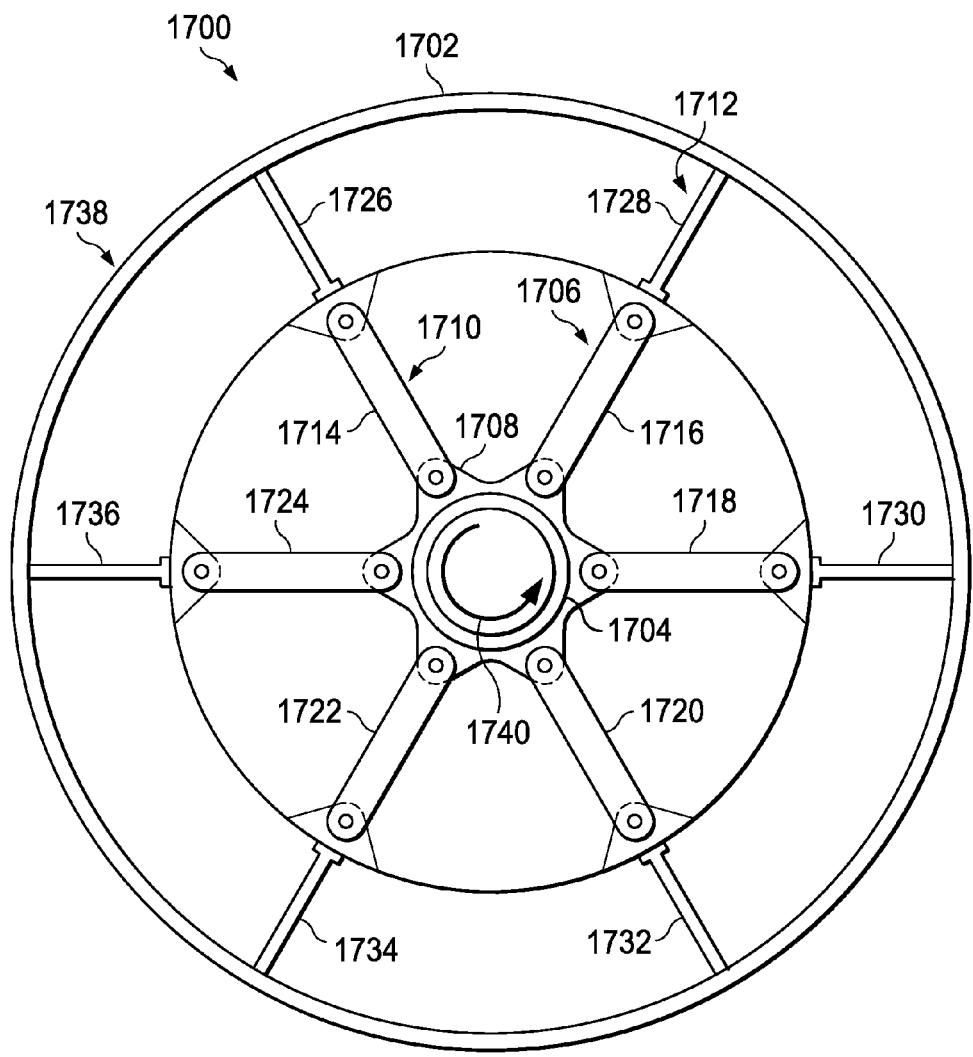
FIG. 17 is an illustration of a segment for a nose cone in accordance with an illustrative example.

With reference now to FIG. 17, an illustration of a segment for a nose cone is depicted in accordance with an illustrative example. As depicted, segment 1702 may form a portion of nose cone 1700. Segment 1702 may be an example of one implementation for one of plurality of segments 114 in FIG. 1. Segment 1702 may be stabilized using hub 1704 and segment moving system 1706. Segment moving system 1706 includes plurality of spokes 1710 that are moveably connected to flanges 1708 of hub 1704.

Plurality of spokes 1710 includes spokes 1714, 1716, 1718, 1720, 1722, and 1724. Plurality of blades 1712 includes blades 1726, 1728, 1730, 1732, 1734, and 1736. Hub 1704 may be rotated in the direction of arrow 1740, which may cause plurality of spokes 1710 to pull outer surface 1738 of segment 1702 inwards towards the hub. For example, hub 1704 may be rotated up to about 30 degrees, which may cause outer surface 1738 to be contracted by about 10 percent. However, in actual operation, hub 1704 may be rotated such that outer surface 1738 contracts by about 0.2 to about 0.8 percent. The optimal geometry for hub 1704 and plurality of spokes 1710 may be selected such that the magnitude of the rotation of hub 1704 may be matched with optimal radial movement of the outer perimeter of segment 1702.

Figure 18:
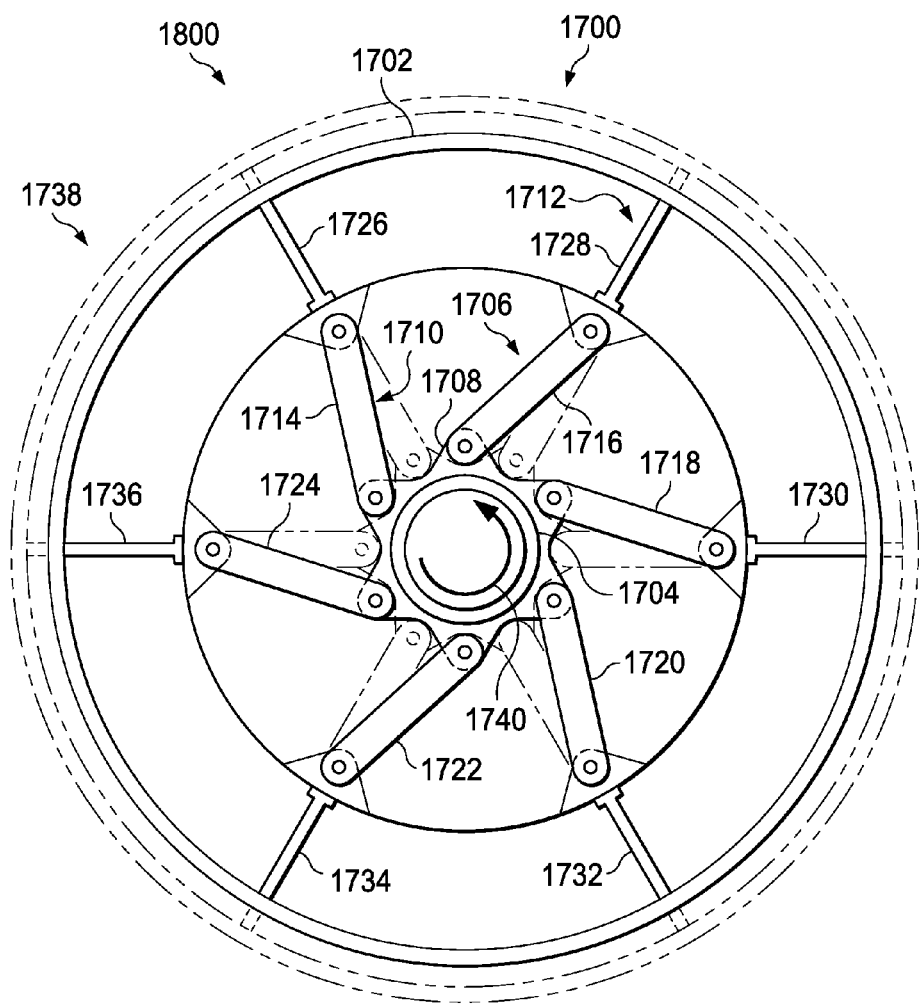
FIG. 18 is an illustration of a segment in accordance with an illustrative example.

Turning now to FIG. 18, an illustration of segment 1702 from FIG. 17 is depicted in accordance with an illustrative example. As depicted, segment 1702 has been moved to state 1800 and reduced in size.

In this manner, the different moveable segments of a nose cone may be reduced in size for stowage in the manner described in FIG. 17. In some cases, the equipment used to rotate the hubs for these segments may be associated with the aerospace vehicle to which the nose cone belongs. In other cases, the equipment may be present on ground and used once the aerospace vehicle has returned to ground.

The illustrations of two-stage hypersonic vehicle 200 in FIG. 2, nose cone 206 in FIGS. 2-16, and segment 1702 in FIGS. 17-18 are not meant to imply physical or architectural limitations to the manner in which an illustrative example may be implemented. Other components in addition to or in place of the ones illustrated may be used. Some components may be optional.

For example, although nose cone 206 is shown having four segments, nose cone 206 may have any number of segments. Depending on the implementation, nose cone 206 may have two segments, three segments, five segments, eight segments, or some other number of segments.

The different components shown in FIGS. 2-18 may be illustrative examples of how components shown in block form in FIG. 1 can be implemented as physical structures. Additionally, some of the components in FIGS. 2-18 may be combined with components in FIG. 1, used with components in FIG. 1, or a combination of the two.

For example, sliding connections may be used instead of roller systems and track systems. Further, other types of devices may be used instead of actuators that operate based on hydraulic fluid. For example, any combination of screw jacks, cable pulley systems, scissor jacks, chain drives, mechanical springs, and/or other types of devices may be used to move nose cone 206 between expanded state 214 and retracted state 211.

Figure 19:
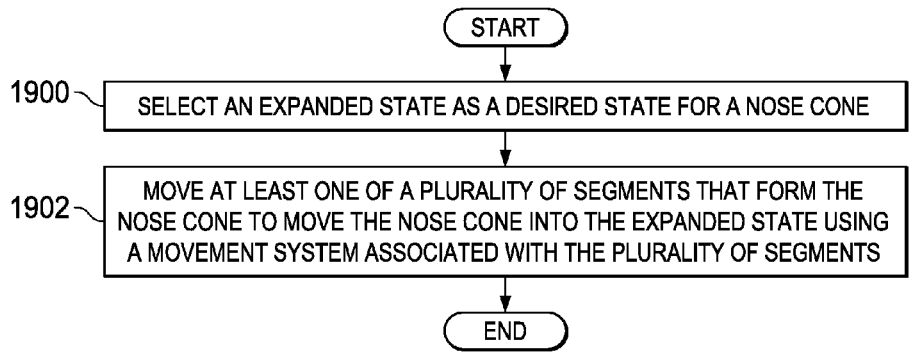
FIG. 19 is an illustration of a process for moving a nose cone into an expanded state in the form of a flowchart in accordance with an illustrative example.

With reference now to FIG. 19, an illustration of a process for moving a nose cone into an expanded state is depicted in the form of a flowchart in accordance with an illustrative example. The process illustrated in FIG. 19 may be implemented using nose cone 100 from FIG. 1.

The process begins by selecting an expanded state as a desired state for the nose cone (operation 1900). Then, at least one of a plurality of segments that form the nose cone is moved to move the nose cone into the expanded state using a movement system associated with the plurality of segments (operation 1902), with the process terminating thereafter.

Figure 20:
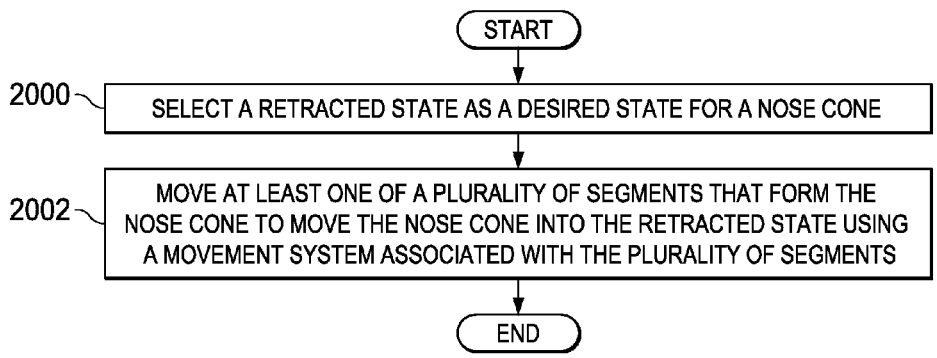
FIG. 20 is an illustration of a process for moving a nose cone into a retracted state in the form of a flowchart in accordance with an illustrative example.

With reference now to FIG. 20, an illustration of a process for moving a nose cone into a retracted state is depicted in the form of a flowchart in accordance with an illustrative example. The process illustrated in FIG. 20 may be implemented using nose cone 100 from FIG. 1.

The process begins by selecting a retracted state as a desired state for the nose cone (operation 2000). Then, at least one of a plurality of segments that form the nose cone is moved to move the nose cone into the retracted state using a movement system associated with the plurality of segments (operation 2002), with the process terminating thereafter.

Figure 21:
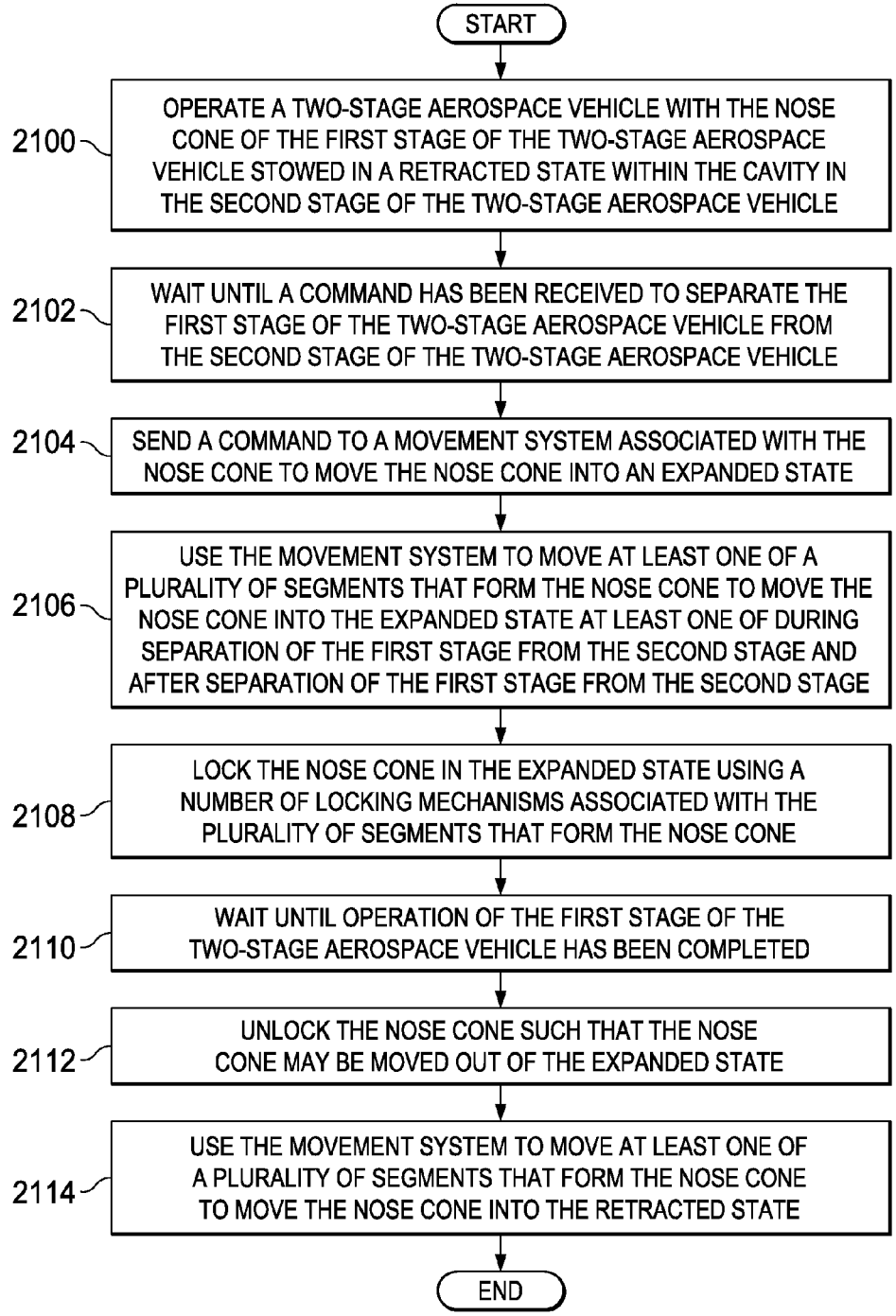
FIG. 21 is an illustration of a process for moving the nose cone of the first stage of a two-stage aerospace vehicle between a retracted state and an expanded state in the form of a flowchart in accordance with an illustrative example.

With reference now to FIG. 21, an illustration of a process for moving the nose cone of the first stage of a two-stage aerospace vehicle between a retracted state and an expanded state is depicted in the form of a flowchart in accordance with an illustrative example. The process illustrated in FIG. 21 may be implemented using nose cone 100 from FIG. 1.

The process begins by operating a two-stage aerospace vehicle with the nose cone of the first stage of the two-stage aerospace vehicle stowed in a retracted state within the cavity in the second stage of the two-stage aerospace vehicle (operation 2100). Next, the process waits until a command has been received to separate the first stage of the two-stage aerospace vehicle from the second stage of the two-stage aerospace vehicle (operation 2102).

In response to receiving a command to separate the first stage from the second stage, a command is sent to a movement system associated with the nose cone to move the nose cone into an expanded state (operation 2104). In response to receiving this command, the movement system is used to move at least one of a plurality of segments that form the nose cone to move the nose cone into the expanded state during separation of the first stage from the second stage and after separation of the first stage from the second stage (operation 2106).

Thereafter, the nose cone is locked in the expanded state using a number of locking mechanisms associated with the plurality of segments that form the nose cone (operation 2108). The process waits until operation of the first stage of the two-stage aerospace vehicle has been completed (operation 2110). Operation of the first stage of the two-stage aerospace vehicle may be considered completed once the first stage has landed on the ground, once the first stage has been moved to a storage facility, or once the mission of the first stage has been completed.

In response to completion of the operation of the first stage, the nose cone is unlocked such that the nose cone may be moved out of the expanded state (operation 2112). Operation 2112 may be performed using, for example, manual force to unlock the number of locking mechanisms or commands generated by a controller. The movement system is then used to move at least one of a plurality of segments that form the nose cone to move the nose cone into the retracted state (operation 2114), with the process terminating thereafter.

The flowcharts and block diagrams in the different depicted examples illustrate the architecture, functionality, and operation of some possible implementations of apparatuses and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 22:
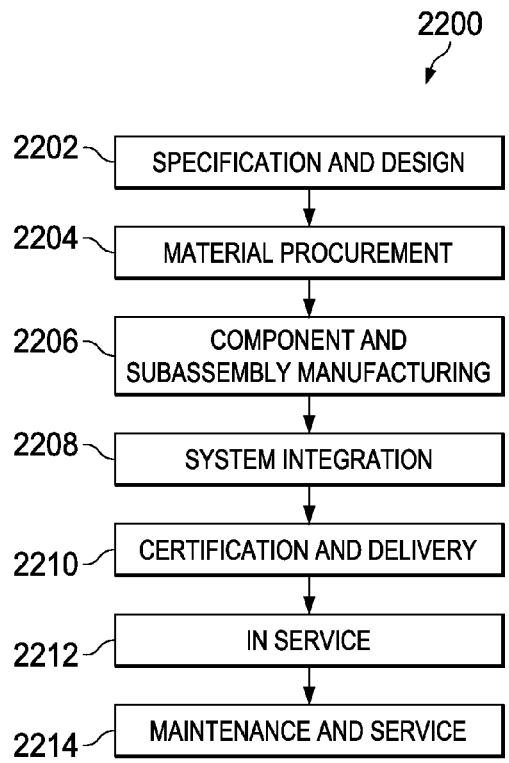
FIG. 22 is an illustration of an aerospace vehicle manufacturing and service method in the form of a block diagram in accordance with an illustrative example.
Figure 23:
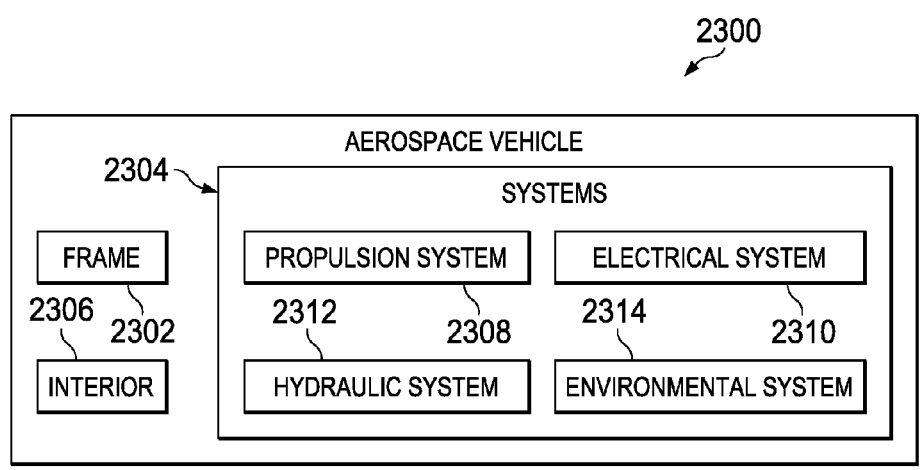
FIG. 23 is an illustration of an aerospace vehicle in the form of a block diagram in accordance with an illustrative example.

Illustrative examples of the disclosure may be described in the context of aerospace vehicle manufacturing and service method 2200 as shown in FIG. 22 and aerospace vehicle 2300 as shown in FIG. 23. Turning first to FIG. 22, an illustration of an aerospace vehicle manufacturing and service method is depicted in the form of a block diagram in accordance with an illustrative example. During pre-production, aerospace vehicle manufacturing and service method 2200 may include specification and design 2202 of aerospace vehicle 2300 in FIG. 23 and material procurement 2204.

During production, component and subassembly manufacturing 2206 and system integration 2208 of aerospace vehicle 2300 in FIG. 23 takes place. Thereafter, aerospace vehicle 2300 in FIG. 23 may go through certification and delivery 2210 in order to be placed in service 2212. While in service 2212 by a customer, aerospace vehicle 2300 in FIG. 23 is scheduled for routine maintenance and service 2214, which may include modification, reconfiguration, refurbishment, and other maintenance or service.

Each of the processes of aerospace vehicle manufacturing and service method 2200 may be performed or carried out by a system integrator, a third party, and/or an operator. In these examples, the operator may be a customer. For the purposes of this description, a system integrator may include, without limitation, any number of aerospace vehicle manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aerospace vehicle is depicted in the form of a block diagram in which an illustrative example may be implemented. In this example, aerospace vehicle 2300 is produced by aerospace vehicle manufacturing and service method 2200 in FIG. 22 and may include airframe 2302 with systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative examples may be applied to other industries, such as the automotive industry.

Apparatuses and methods described herein may be employed during at least one of the stages of aerospace vehicle manufacturing and service method 2200 in FIG. 22. In one illustrative example, components or subassemblies produced in component and subassembly manufacturing 2206 in FIG. 22 may be fabricated or manufactured in a manner similar to components or subassemblies produced while aerospace vehicle 2300 is in service 2212 in FIG. 22. As yet another example, one or more apparatus examples, method examples, or a combination thereof may be utilized during production stages, such as component and subassembly manufacturing 2206 and system integration 2208 in FIG. 22.

One or more apparatus examples, method examples, or a combination thereof may be utilized while aerospace vehicle 2300 is in service 2212 and/or during maintenance and service 2214 in FIG. 22. The use of a number of the different illustrative examples may substantially expedite the assembly of and/or reduce the cost of aerospace vehicle 2300.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The examples selected are chosen and described in order to best explain the principles of the examples, the practical application, and to enable others of ordinary skill in the art to understand the disclosure for various examples with various modifications as are suited to the particular use contemplated.

What is claimed is:

1. An apparatus comprising:
    a plurality of segments that form a nose cone, such that each segment in the plurality of segments comprises: a segment outer surface that forms a portion of an outer surface of the nose cone, a concentric shape about a central axis of the nose cone, and a configuration that nests, concentrically about the central axis, within a base portion of the nose cone when the each segment is in a retracted state; and
    a movement system located within the nose cone and comprising a plurality of actuators, each actuator in the plurality of actuators being housed in a structure centered along the central axis and connected to a unique segment in the plurality of segments, such that in operation at least one of the plurality of actuators moves at least one of the plurality of segments such that the nose cone moves between the retracted state and an expanded state.

2. The apparatus of claim 1 further comprising:
    one or more locking mechanisms used to lock the plurality of segments in place when the nose cone is in at least one of the expanded state or the retracted state.

3. The apparatus of claim 1, wherein the plurality of segments is concentrically aligned with an axis within selected tolerances.

4. The apparatus of claim 1, further comprising:
    the nose cone being stowed within each the plurality of segments when the nose cone is in the retracted state, and
    the actuator, for each segment in the plurality of segments, being configured to move the each segment at a desired rate for the each segment, respectively, such that in operation the actuator moves the each segment at the desired rate for the each segment, respectively.

5. The apparatus of claim 1, wherein the plurality of segments comprises:
    a fixed segment that forms a stowage area; and
    moveable segments in which each of the moveable segments is moveable relative to the fixed segment.

6. The apparatus of claim 5, wherein the movement system is used to move the moveable segments into the stowage area of the fixed segment to move the nose cone into the retracted state and to move the moveable segments out of the stowage area of the fixed segment to move the nose cone into the expanded state.

7. The apparatus of claim 1, wherein the movement system comprises:
    a plurality of segment movement systems, wherein each of the segment movement systems comprises a hydraulic actuator that moves a corresponding segment in the plurality of segments.

8. The apparatus of claim 7, wherein the segment movement system in the plurality of segment movement systems further comprises a plurality of tracks, or wheels, or a combination thereof.

9. The apparatus of claim 1, wherein the outer surface of the nose cone is a continuous and uninterrupted surface when the nose cone is in the expanded state.

10. The apparatus of claim 1, wherein the plurality of segments comprises:
    a first segment;
    a second segment;
    a third segment; and
    a fourth segment that forms a tip portion of the nose cone, wherein the second segment is nested within the first segment, the third segment nested within the second segment, and the fourth segment is nested within the third segment when the nose cone is in the retracted state.

11. The apparatus of claim 1, wherein the nose cone is part of a first platform that is attached to a second platform when the nose cone is in the retracted state.

12. The apparatus of claim 11, wherein the first platform is a first stage of an aerospace vehicle and the second platform is a second stage of the aerospace vehicle in which the nose cone is attached to the second stage of the aerospace vehicle, when the nose cone is in the retracted state.

13. The apparatus of claim 12, wherein the aerospace vehicle is a multi-stage hypersonic vehicle.

14. A nose cone comprising:
    a fixed segment that forms a stowage area that comprises a central axis;
    one or more moveable segments, each of the moveable segments configured to be concentric around the central axis and moveable relative to the fixed segment, such that in operation, each of the moveable segments moves relative to the fixed segment, and nests, concentrically about the central axis, within a base portion of the nose cone when the each of the movable segments is in a retracted state; and
    a movement system located within the nose cone and comprising a plurality of actuators, each actuator in the plurality of actuators being housed in a structure centered along the central axis and connected to a unique segment in the moveable segments, such that in operation at least one of the plurality of actuators moves at least one of the moveable segments, such that the nose cone moves between the retracted state and an expanded state.

15. The nose cone of claim 14 further comprising:
    locking mechanisms used to lock the moveable segments in place when the nose cone is in at least one of the expanded state or the retracted state.

16. A method for operating a nose cone, the method comprising:
    selecting one of a retracted state and an expanded state as a desired state for the nose cone, such that the nose cone comprises a plurality of segments, such that each segment in the plurality of segments comprises: a segment outer surface that forms a portion of an outer surface of the nose cone, a concentric shape about a central axis of the nose cone, and a configuration that nests, concentrically about the central axis, within a base portion of the nose cone when the each segment is in the retracted state; and
    moving at least one of the plurality of segments to move the nose cone, into the desired state using a movement system located within the nose cone and comprising a plurality of actuators, each actuator in the plurality of actuators being housed in a structure centered along the central axis and connected to a unique segment in the plurality of segments; such that in operation at least one of the plurality of actuators moves at least one of the plurality of segments such that the nose cone moves between the retracted state and the expanded state.

17. The method of claim 16, wherein selecting the one of the retracted state and the expanded state as the desired state for the nose cone comprises:
   selecting the expanded state as the desired state for the nose cone.

18. The method of claim 17 further comprising:
   locking the nose cone in the expanded state using locking mechanisms after the nose cone has been moved into the expanded state.

19. The method of claim 16, wherein selecting the one of the retracted state and the expanded state as the desired state for the nose cone comprises:
   selecting the retracted state as the desired state for the nose cone.

20. The method of claim 19, wherein moving the at least one of the plurality of segments to move the nose cone into the desired state using the movement system associated with the plurality of segments comprises:
   moving the at least one of the plurality of segments to move the nose cone into the retracted state while the nose cone is being moved into a cavity for stowing, via the actuator, for the at least one of the plurality of segments, moving the at least one of the plurality of segments along a track at a desired rate for the at least one of the plurality of segments, and the actuator moving the nose cone at a desired rate for the nose cone.

* * * * *